(12) United States Patent
Xu et al.

(10) Patent No.: US 10,932,140 B2
(45) Date of Patent: Feb. 23, 2021

(54) LINK RESTORATION METHOD AND APPARATUS, AND DEVICE

(71) Applicant: Huawei Technologies Co., Ltd., P.R. (CN)

(72) Inventors: Kaili Xu, Chengdu (CN); Kaijun Cheng, Chengdu (CN); Ji Wu, Shanghai (CN); Yingpei Lin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 16/252,473

(22) Filed: Jan. 18, 2019

(65) Prior Publication Data

US 2019/0159038 A1   May 23, 2019

Related U.S. Application Data

(63) Continuation of application No. PCT/CN2017/090482, filed on Jun. 28, 2017.

(30) Foreign Application Priority Data

Jul. 26, 2016  (CN) .......................... 201610596842.7

(51) Int. Cl.
*H04W 16/28* (2009.01)
*H04W 24/04* (2009.01)
(Continued)

(52) U.S. Cl.
CPC .......... *H04W 16/28* (2013.01); *H04B 7/0617* (2013.01); *H04W 24/04* (2013.01);
(Continued)

(58) Field of Classification Search
CPC ..... H04W 16/28; H04W 76/19; H04W 24/04; H04W 72/0446; H04W 74/0808; H04W 72/046; H04B 7/0617
See application file for complete search history.

(56) References Cited

U.S. PATENT DOCUMENTS 9,356,673 B2   5/2016  Hansen et al.
2005/0021770 A1*  1/2005  Helm ................... H04W 76/19
709/228

(Continued)

FOREIGN PATENT DOCUMENTS

CN   102484807 A   5/2012
CN   102577176 A   7/2012

(Continued)

OTHER PUBLICATIONS

International Standard, ISO/IEC/IEEE 8802-11, First edition Nov. 1, 2012 Amendment 3 dated May 15, 2014, Information technology—Telecommunications and information exchange between systems—Local and metropolitan area networks—Specific requirements—Part 11:Wireless LAN medium access control (MAC) and physical layer (PHY) specifications, Amendment 3: Enhancements for very high throughput in the 60 GHz band (adoption of IEEE Std 802.11ad-2012), dated May 15, 2014, 634 pages.

*Primary Examiner* — Ian N Moore
*Assistant Examiner* — Latresa A McCallum
(74) *Attorney, Agent, or Firm* — Kilpatrick Townsend & Stockton LLP

(57) ABSTRACT

Embodiments of this application provide a link restoration method and apparatus, and a device. The method includes: if quality of a link between a first communications device and a second communications device does not meet a preset condition, detecting, by the first communications device within timing duration of a first timer, whether the link is restored, and obtaining a detection result, where the timing (Continued)

duration of the first timer is blockage duration of a link blockage resulting from a user movement; and determining, by the first communications device based on the detection result, whether to perform a link restoration operation, where the link restoration operation includes at least one of a beam tracking operation, a beam refinement operation, or a redo-beamforming operation.

16 Claims, 12 Drawing Sheets

(51) Int. Cl.
    *H04W 76/19*     (2018.01)
    *H04B 7/06*     (2006.01)
    *H04W 72/04*     (2009.01)
    *H04W 74/08*     (2009.01)

(52) U.S. Cl.
    CPC ... *H04W 72/0446* (2013.01); *H04W 74/0808* (2013.01); *H04W 76/19* (2018.02); *H04W 72/046* (2013.01)

(56) References Cited

U.S. PATENT DOCUMENTS

| | | | |
|---|---|---|---|
| 2009/0010244 A1* | 1/2009 | Laroia | H04L 5/0032 370/350 |
| 2011/0096737 A1 | 4/2011 | Venkatachalam et al. | |
| 2012/0009880 A1 | 1/2012 | Trainin et al. | |
| 2012/0224470 A1* | 9/2012 | Jeong | H04L 5/0098 370/221 |
| 2014/0011445 A1 | 1/2014 | Trainin et al. | |
| 2015/0071227 A1 | 3/2015 | Yi et al. | |
| 2016/0337916 A1* | 11/2016 | Deenoo | H04W 36/0088 |
| 2018/0124619 A1 | 5/2018 | Xu et al. | |

FOREIGN PATENT DOCUMENTS

| | | |
|---|---|---|
| CN | 103596195 A | 2/2014 |
| CN | 103747471 A | 4/2014 |
| CN | 104811982 A | 7/2015 |
| CN | 105515912 A | 4/2016 |
| WO | 2008154851 A1 | 12/2008 |

\* cited by examiner

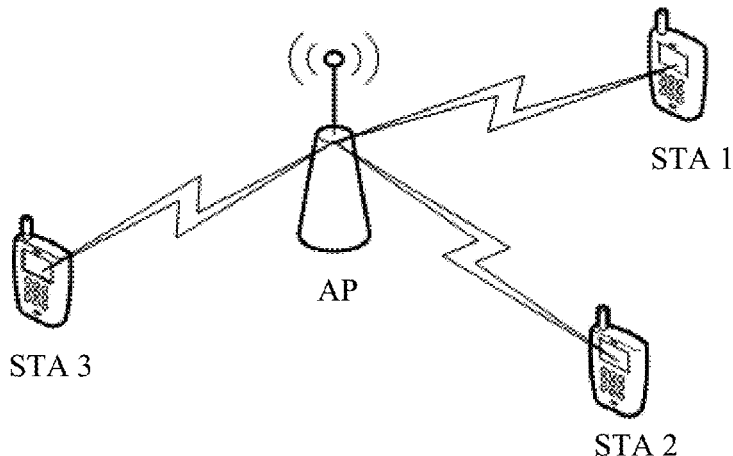

FIG. 1

```
If quality of a link between a first communications device and a second
communications device does not meet a preset condition, the first
communications device detects, within timing duration of a first timer,       S101
whether the link is restored, and obtains a detection result, where the
timing duration of the first timer is blockage duration of a link blockage
resulting from a user movement
```

```
The first communications device determines, based on the detection result,    S102
whether to perform a link restoration operation
```

FIG. 2

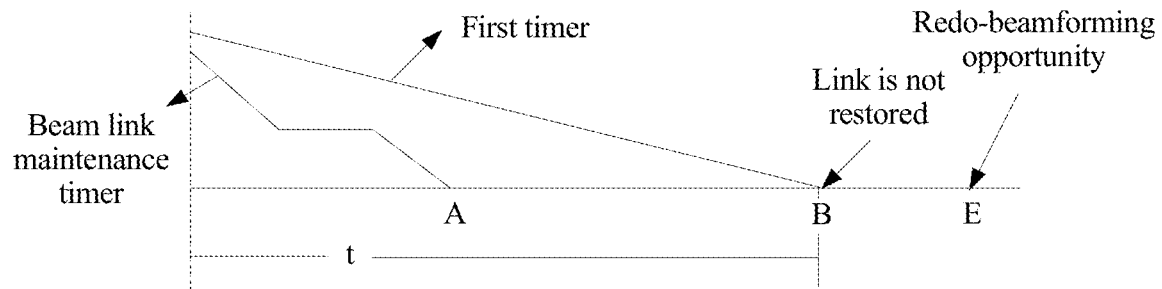
FIG. 9
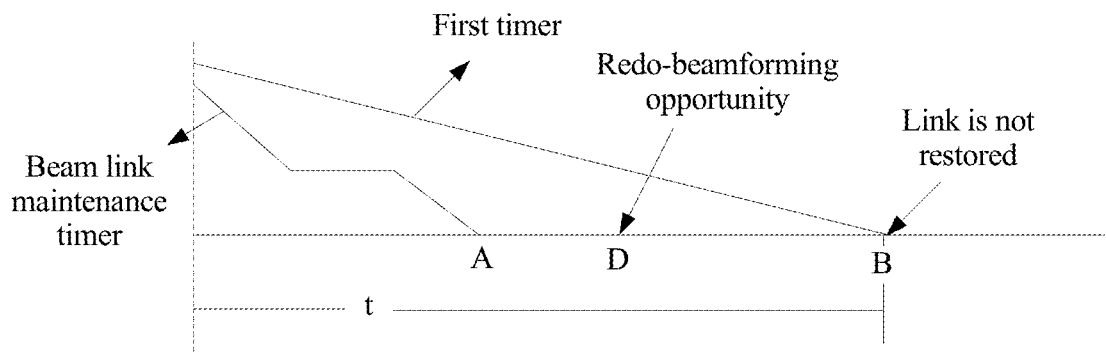
FIG. 10
| A first communications device determines timing duration of a first timer based on a current communication scenario | S501 |
|---|---|
| The first communications device sends the timing duration of the first timer to a second communications device | S502 |
FIG. 11

LINK RESTORATION METHOD AND APPARATUS, AND DEVICE

CROSS-REFERENCE TO RELATED APPLICATIONS

This application is a continuation of International Application No. PCT/CN2017/090482 filed on Jun. 28, 2017, which claims priority to Chinese Patent Application No. 201610596842.7 filed on Jul. 26, 2016. The disclosures of the aforementioned applications are hereby incorporated by reference in their entireties.

STATEMENT OF JOINT RESEARCH AGREEMENT

The subject matter and the claimed invention were made by or on the behalf of Xipu campus, Southwest Jiaotong University, of Chengdu, Sichuan, P.R. China and Huawei Technologies Co., Ltd., of Shenzhen, Guangdong Province, P.R. China, under a joint research agreement titled "Research Project for Next Generation 60 GHz WiFi MAC Technology". The joint research agreement was in effect on or before the claimed invention was made, and that the claimed invention was made as a result of activities undertaken within the scope of the joint research agreement.

TECHNICAL FIELD

This application relates to communications technologies, and in particular, to a link restoration method and apparatus, and a device.

BACKGROUND

As a subsystem in a wireless local area network system, 802.11ad works at a 60 GHz high frequency band (57 GHz to 66 GHz), and is mainly used for wireless transmission of high-definition audio and video signals inside a home and an enterprise. In terms of multimedia application, 802.11ad features a high capacity, a high rate, a low delay, low power consumption, and the like.

In an existing 802.11ad standard, a beam link maintenance timer (link maintenance timer) is applied to maintain a trained link, and a value of duration of the link maintenance timer is determined by two ends (namely, a transmit end and a receive end) of the link through negotiation. When beamforming for the link is completed, the link maintenance timer is enabled and counts down. The link maintenance timer stops timing when a time period for transmitting other data arrives. When one end of the link transmits or receives an acknowledgement frame, a sending clearance frame, or a sending rejection frame, the link maintenance timer is reset to an initial value. In the 802.11ad standard, maximum duration of the link maintenance timer is 128 ms. However, because timing may be stopped midway, actual duration is a random value.

In the prior art, in a process of data transmission between the two ends of the link, once degradation of link quality is detected (for example, a part of the link or the entire link is blocked for a short time), beam tracking (beam tracking) or beam refinement (beam refinement) is applied to restore the link quality. If the link quality is still not restored through beam tracking or beam refinement when the link maintenance timer expires, a redo-beamforming (Redo-beamforming) opportunity starts to be waited for. Redo-beamforming is immediately performed when the redo-beamforming opportunity arrives, to re-train a beam between the two ends of the link.

However, in the prior art, the method for restoring a link when quality of the link is degraded is relatively blind, and an actual situation of current link quality degradation cannot be considered. Consequently, link restoration accuracy is not high.

SUMMARY

Embodiments of this application provide a link restoration method and apparatus, and a device, to resolve a prior-art technical problem that link restoration accuracy is not high because a method for restoring a link when quality of the link is degraded is relatively blind and an actual situation of current link quality degradation cannot be considered.

According to a first aspect, an embodiment of this application provides a link restoration method, including:

if quality of a link between a first communications device and a second communications device does not meet a preset condition, detecting, by the first communications device within timing duration of a first timer, whether the link is restored, and obtaining a detection result, where the timing duration of the first timer is blockage duration of a link blockage resulting from a user movement; and determining, by the first communications device based on the detection result, whether to perform a link restoration operation, where the link restoration operation includes at least one of a beam tracking operation, a beam refinement operation, or a redo-beamforming operation.

According to the link restoration method provided in the first aspect, when the quality of the link between the first communications device and the second communications device is degraded, the first communications device detects, within the timing duration of the first timer, whether the link is restored, and determines, based on the detection result obtained through the detection, whether to perform the link restoration operation. Therefore, a case in which a link restoration operation is blindly performed to restore a link in a scenario in which quality of the link is degraded for a short time due to a human blockage and is restored later can be avoided. In other words, determining can be comprehensively performed with reference to an actual situation of current link quality degradation in the embodiments of this application, thereby greatly improving link restoration accuracy.

In a possible design, the detecting, by the first communications device within timing duration of a first timer, whether the link is restored specifically includes:

sending, by the first communications device, a null data packet (NDP) to the second communications device; and if the first communications device receives, before the first timer expires, response information sent by the second communications device, determining that the link is restored.

In the link restoration method provided in this possible design, restoration of the link is detected by using the NDP. Because the NDP is an extremely short null data packet, detection overheads consumed when the first communications device detects whether the link is restored are relatively small, and efficiency of detecting, by the first communications device, whether the link is restored is greatly improved.

In a possible design, the determining, by the first communications device based on the detection result, whether to perform a link restoration operation specifically includes:

if the detection result is that restoration of the link is detected before the first timer expires, determining, by the first communications device, not to perform the beam tracking operation or the beam refinement operation, and resetting the first timer to an initial value, where the timing duration of the first timer is less than timing duration of a beam link maintenance timer.

In the link restoration method provided in this possible design, when the first communications device detects restoration of the link before the first timer expires, the first communications device determines to skip performing the beam tracking operation or the beam refinement operation, so that the first communications device is prevented from blindly performing the beam tracking operation or the beam refinement operation when a human blockage occurs, thereby greatly reducing link restoration overheads.

In a possible design, the determining, by the first communications device based on the detection result, whether to perform a link restoration operation specifically includes:

if the detection result is that restoration of the link is detected after a beam link maintenance timer expires and before the first timer expires, determining, by the first communications device based on a detected link restoration moment, whether to perform the redo-beamforming operation.

In a possible design, the determining, by the first communications device based on a detected link restoration moment, whether to perform the redo-beamforming operation specifically includes:

if the detected link restoration moment is prior to an enabling moment of the redo-beamforming operation, determining, by the first communications device, not to perform the redo-beamforming operation.

In a possible design, if restoration of the link is not detected before the redo-beamforming operation is enabled, the first communications device determines to perform the redo-beamforming operation, and when detecting restoration of the link, transmits data by using an initial beam parameter used before the redo-beamforming.

In a possible design, if the detection result is that restoration of the link is not detected when the first timer expires, and if the redo-beamforming operation is not enabled, link detection is stopped, and the redo-beamforming operation waits to be performed, where the timing duration of the first timer is greater than timing duration of a beam link maintenance timer; or if the detection result is that restoration of the link is not detected when the first timer expires, and if the redo-beamforming operation is enabled after a beam link maintenance timer expires and before the first timer expires, data is transmitted by using a beam parameter obtained after the redo-beamforming.

In the link restoration method provided in the foregoing possible designs, when the first communications device detects restoration of the link in a time period after the link maintenance timer expires and before the first timer expires, and a link restoration moment is prior to an enabling moment of the redo-beamforming operation, the first communications device determines to skip performing the redo-beamforming operation, so that the first communications device is prevented from blindly performing a redo-beamforming operation with relatively large communication overheads in a scenario of link quality degradation resulting from a human blockage, thereby greatly reducing signaling overheads of link restoration.

In a possible design, before the quality of the link between the first communications device and the second communications device does not meet the preset condition, the method further includes:

determining, by the first communications device, the timing duration of the first timer based on a current communication scenario, where the communication scenario includes any one of a blockage scenario of a home living room, a blockage scenario of dense wearables use in airplane, and a blockage scenario of an office conference room; and sending, by the first communications device, the timing duration of the first timer to the second communications device.

In a possible design, the sending, by the first communications device, the timing duration of the first timer to the second communications device specifically includes: adding, by the first communications device, the timing duration of the first timer to a communication frame, and sending the communication frame to the second communications device, where the communication frame includes any one of a probe frame, an announce frame, an information request frame, and a response frame.

In a possible design, the communication frame includes: an Element ID field representing an identifier of an Element including the timing duration of the first timer, a link blockage maintenance field, and a Length field used to represent a length of the link blockage maintenance field; and the link blockage maintenance field is used to represent the timing duration of the first timer in the current communication scenario.

In a possible design, the method further includes:

enabling the first timer when data is transmitted between the first communications device and the second communications device, and resetting the first timer when the first communications device transmits first information; where the first information includes at least one of an immediate response, a request for service period, a polling frame, an authorization frame, a request frame, an acknowledgement frame, a block acknowledgement frame, a directional multi-gigabit deny-to-send frame, and a directional multi-gigabit clear-to-send frame.

In the link restoration method provided in the foregoing possible designs, before data is transmitted between two ends of the link, the first communications device determines the timing duration of the first timer based on the current communication scenario, and then sends the timing duration to the second communications device by using a corresponding communication frame. In this way, first timers at the two ends are simultaneously enabled when data transmission starts, and frame structure design of the communication frame in the transmission process ensures that the two ends of the link can negotiate current remaining duration of the first timers in the data transmission process. This can ensure accuracy of detecting, by the first communications device within the timing duration of the first timer, whether the link is restored, thereby greatly improving accuracy of restoring the link by the first timer.

According to a second aspect, an embodiment of this application provides a link restoration apparatus, including:

a detection module, configured to: when quality of a link between a first communications device and a second communications device does not meet a preset condition, detect, within timing duration of a first timer, whether the link is restored, and obtain a detection result, where the timing duration of the first timer is blockage duration of a link blockage resulting from a user movement; and a judging module, configured to determine, based on the detection result, whether to perform a link restoration operation, where the link restoration operation includes at least one of a beam tracking operation, a beam refinement operation, or a redo-beamforming operation.

In a possible design, the detection module specifically includes: a sending unit, a receiving unit, and a judging unit;

the sending unit is configured to send a null data packet (NDP) to the second communications device; and the judging unit is configured to: when the receiving unit receives, before the first timer expires, response information sent by the second communications device, determine that the link is restored.

In a possible design, the judging module is specifically configured to: when the detection result is that restoration of the link is detected before the first timer expires, determine not to perform the beam tracking operation or the beam refinement operation, and reset the first timer to an initial value, where the timing duration of the first timer is less than timing duration of a beam link maintenance timer.

In a possible design, the judging module is specifically configured to: when the detection result is that restoration of the link is detected after a beam link maintenance timer expires and before the first timer expires, determine, based on a detected link restoration moment, whether to perform the redo-beamforming operation.

In a possible design, the judging module is specifically configured to: when the detected link restoration moment is prior to an enabling moment of the redo-beamforming operation, determine not to perform the redo-beamforming operation.

In a possible design, the apparatus further includes a data transmission module, and the judging module is specifically configured to: if restoration of the link is not detected before the redo-beamforming operation is enabled, determine to perform the redo-beamforming operation, and when the detection module detects restoration of the link, instruct the data transmission module to transmit data by using an initial beam parameter used before the redo-beamforming.

In a possible design, the apparatus further includes a redo-beamforming module, and the judging module is specifically configured to: if the detection result is that restoration of the link is not detected when the first timer expires, and if the redo-beamforming operation is not enabled, instruct the detection module to stop link detection, and instruct the redo-beamforming module to wait to perform the redo-beamforming operation, where the timing duration of the first timer is greater than timing duration of a beam link maintenance timer; or if the detection result is that restoration of the link is not detected when the first timer expires, and if the redo-beamforming operation is enabled after a beam link maintenance timer expires and before the first timer expires, instruct the data transmission module to transmit data by using a beam parameter obtained after the redo-beamforming.

In a possible design, the apparatus further includes a determining module and a sending module;

the determining module is configured to determine the timing duration of the first timer based on a current communication scenario, where the communication scenario includes any one of a blockage scenario of a home living room, a blockage scenario of dense wearables use in airplane, and a blockage scenario of an office conference room; and the sending module is configured to send the timing duration of the first timer to the second communications device.

In a possible design, the sending module is specifically configured to add the timing duration of the first timer to a communication frame, and send the communication frame to the second communications device, where the communication frame includes any one of a probe frame, an announce frame, an information request frame, and a response frame.

In a possible design, the communication frame includes: an Element ID field representing an identifier of an Element including the timing duration of the first timer, a link blockage maintenance field, and a Length field used to represent a length of the link blockage maintenance field; and the link blockage maintenance field is used to represent the timing duration of the first timer in the current communication scenario.

In a possible design, the apparatus further includes a processing module, and the processing module is configured to enable the first timer when data is transmitted between the first communications device and the second communications device, and reset the first timer when the first communications device transmits first information; where the first information includes at least one of an immediate response, a request for service period, a polling frame, an authorization frame, a request frame, an acknowledgement frame, a block acknowledgement frame, a directional multi-gigabit deny-to-send frame, and a directional multi-gigabit clear-to-send frame.

For beneficial effects of the link restoration apparatus provided in the second aspect and the possible designs of the second aspect, refer to the beneficial effects brought by the first aspect and the possible designs of the first aspect. Details are not described herein.

According to a third aspect, an embodiment of this application provides a communications device, including:

a processor, configured to: if quality of a link between the communications device and a second communications device does not meet a preset condition, detect, within timing duration of a first timer, whether the link is restored, obtain a detection result, and determine, based on the detection result, whether to perform a link restoration operation, where the timing duration of the first timer is blockage duration of a link blockage resulting from a user movement, and the link restoration operation includes at least one of a beam tracking operation, a beam refinement operation, or a redo-beamforming operation.

In a possible design, the communications device further includes a transmitter and a receiver;

the transmitter is configured to send a null data packet (NDP) to the second communications device; and the processor is specifically configured to: when the receiver receives, before the first timer expires, response information sent by the second communications device, determine that the link is restored.

In a possible design, the processor is specifically configured to: when the detection result is that restoration of the link is detected before the first timer expires, determine not to perform the beam tracking operation or the beam refinement operation, and reset the first timer to an initial value, where the timing duration of the first timer is less than timing duration of a beam link maintenance timer.

In a possible design, the processor is specifically configured to: when the detection result is that restoration of the link is detected after a beam link maintenance timer expires and before the first timer expires, determine, based on a detected link restoration moment, whether to perform the redo-beamforming operation.

In a possible design, the processor is specifically configured to: when the detected link restoration moment is prior to an enabling moment of the redo-beamforming operation, determine not to perform the redo-beamforming operation.

In a possible design, the processor is specifically configured to: if restoration of the link is not detected before the redo-beamforming operation is enabled, determine to perform the redo-beamforming operation, and when detecting restoration of the link, transmit data by using an initial beam parameter used before the redo-beamforming.

In a possible design, the processor is specifically configured to: if the detection result is that restoration of the link is not detected when the first timer expires, and if the redo-beamforming operation is not enabled, stop link detection, and wait to perform the redo-beamforming operation, where the timing duration of the first timer is greater than timing duration of a beam link maintenance timer; or the processor is specifically configured to: if the detection result is that restoration of the link is not detected when the first timer expires, and if the redo-beamforming operation is enabled after a beam link maintenance timer expires and before the first timer expires, transmit data by using a beam parameter obtained after the redo-beamforming.

In a possible design, the processor is further configured to: before detecting, by the first communications device within timing duration of a first timer, whether the link is restored, determine the timing duration of the first timer based on a current communication scenario, where the communication scenario includes any one of a blockage scenario of a home living room, a blockage scenario of dense wearables use in airplane, and a blockage scenario of an office conference room; and the transmitter is configured to send the timing duration of the first timer to the second communications device.

In a possible design, the transmitter is specifically configured to add the timing duration of the first timer to a communication frame, and send the communication frame to the second communications device, where the communication frame includes any one of a probe frame, an announce frame, an information request frame, and a response frame.

In a possible design, the communication frame includes: an Element ID field representing an identifier of an Element including the timing duration of the first timer, a link blockage maintenance field, and a Length field used to represent a length of the link blockage maintenance field; and the link blockage maintenance field is used to represent the timing duration of the first timer in the current communication scenario.

In a possible design, the processor is further configured to enable the first timer when data is transmitted between the communications device and the second communications device, and reset the first timer when the communications device transmits first information; where the first information includes at least one of an immediate response, a request for service period, a polling frame, an authorization frame, a request frame, an acknowledgement frame, a block acknowledgement frame, a directional multi-gigabit deny-to-send frame, and a directional multi-gigabit clear-to-send frame.

For beneficial effects of the communications device provided in the third aspect and the possible designs of the third aspect, refer to the beneficial effects brought by the first aspect and the possible designs of the first aspect. Details are not described herein.

BRIEF DESCRIPTION OF THE DRAWINGS

FIG. 1 is a schematic structural diagram of a WLAN system according to an embodiment of this application;

FIG. 2 is a schematic flowchart of Embodiment 1 of a link restoration method according to the embodiments of this application;

FIG. 9 is a fourth schematic diagram of a relationship between duration of a first timer and duration of a link maintenance timer according to an embodiment of this application;

FIG. 10 is a fifth schematic diagram of a relationship between duration of a first timer and duration of a link maintenance timer according to an embodiment of this application;

FIG. 11 is a schematic flowchart of Embodiment 5 of the link restoration method according to the embodiments of this application;

DETAILED DESCRIPTION

Figure 3:
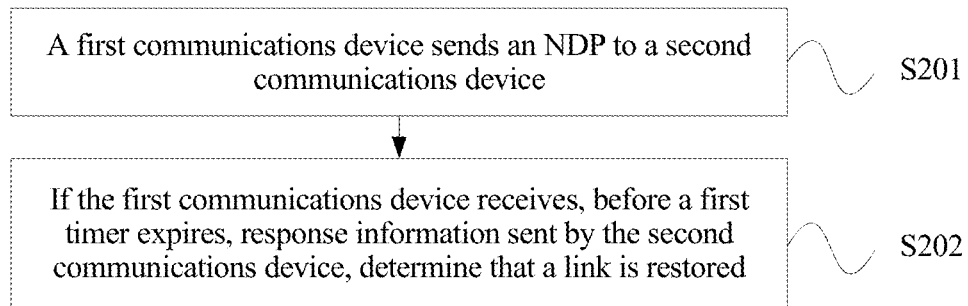
FIG. 3 is a schematic flowchart of Embodiment 2 of the link restoration method according to the embodiments of this application.

The embodiments of this application may be applied to a wireless local area network (WLAN). The WLAN currently uses Institute of Electrical and Electronics Engineers (IEEE) 802.11 series standards. A station (STA) and an access point (AP) are basic components of the WLAN.

The AP is an access point by using which a mobile user enters a wired network. The AP is mainly deployed in home, inside a building, and inside a park, and has a typical coverage radius of tens to hundreds of meters. Certainly, the AP may also be deployed outdoors. An AP is equivalent to a bridge that connects a wired network and a wireless network. A major function of the AP is to connect various wireless network clients and connect the wireless network and Ethernet. Specifically, the AP may be a terminal device or a network device with a WiFi (Wireless Fidelity) chip. Optionally, the AP may be a device that supports the 802.11ax standard. Further, optionally, the AP may be a device that supports a plurality of WLAN standards, such as 802.11ac, 802.11n, 802.11g, 802.11b, and 802.11a. In the embodiments, the AP may also be a device that supports WLAN standards 802.11ad and 802.11ay. Alternatively, the AP in the embodiments of this application may be replaced with a personal basic service set control point (Personal Basic Service Set Control Point, PCP for short), and the PCP may also communicate with a plurality of STAs.

The STAs are generally client devices in the WLAN. The STA may be mobile or fastened, and is a basic component of the wireless local area network. The STA may be a wireless communications chip, a wireless sensor, or a wireless communications terminal, for example, a mobile phone that supports a WiFi communication function, a tablet computer that supports a WiFi communication function, a set top box that supports a WiFi communication function, a smart television that supports a WiFi communication function, an intelligent wearable device that supports a WiFi communication function, an in-vehicle communications device that supports a WiFi communication function, and a computer that supports a WiFi communication function.

FIG. 1 is a schematic structural diagram of a WLAN system according to this application. As shown in FIG. 1, one AP in the WLAN system may exchange information with a plurality of STAs (three STAs are used as an example), including a STA 1, a STA 2, and a STA 3. Certainly, as not limited thereto, one AP may further exchange information with a plurality of STA groups, and interaction may also be performed between a plurality of STAs.

A first communications device in this embodiment may be the AP or the PCP described above, or may be the STA described above, and a second communications device may be the foregoing AP or PCP, or may be the foregoing STA. When the first communications device is an AP or a PCP, the second communications device may be a STA. When the first communications device is a STA, the second communications device may be a STA, or may be an AP or a PCP. In conclusion, specific forms of the first communications device and the second communications device are not limited in this embodiment of this application, provided that the first communications device can communicate with and perform corresponding beamforming (Beamforming, BF for short) with the second communications device.

In the prior art, in a process of data transmission between two ends (a transmit end and a receive end) of a link, once degradation of link quality is detected (for example, a part of the link or the entire link is blocked for a short time), beam tracking or beam refinement is applied to restore the link quality. If the link quality is still not restored through beam tracking or beam refinement when a link maintenance timer expires, a redo-beamforming opportunity starts to be waited for. Redo-beamforming is immediately performed when the redo-beamforming opportunity arrives, to re-train a beam between the two ends of the link. However, an 802.11ay standard supports a mobility scenario, and in a mobility scenario, a link blockage (namely, human blockage) usually occurs due to a user movement, but link quality can be restored within a relatively short period as the user moves. In this scenario, if the prior-art method for restoring link quality is still used, and beam tracking, beam refinement, or even redo-beamforming that consumes larger overheads is blindly performed immediately after degradation of the link quality is detected, although the link can be restored, an actual situation of current link quality degradation cannot be considered, resulting in low link restoration accuracy and extra communication overheads.

Therefore, the embodiments of this application provide the link restoration method and apparatus, and the device, to resolve a prior-art technical problem that link restoration accuracy is not high because a method for restoring a link when quality of the link is degraded is relatively blind and an actual situation of current link quality degradation cannot be considered.

Specific embodiments are used below to describe in detail the technical solutions of this application. The following specific embodiments may be combined with each other, and a same or similar concept or process may not be described repeatedly in some embodiments.

FIG. 2 is a schematic flowchart of Embodiment 1 of the link restoration method according to the embodiments of this application. This embodiment relates to a specific process in which a first communications device and a second communications device determine a current link blockage status before performing a link restoration operation, so as to determine whether to perform a link restoration operation. As shown in FIG. 2, the method includes the following steps.

S101. If quality of a link between the first communications device and the second communications device does not meet a preset condition, the first communications device detects, within timing duration of a first timer, whether the link is restored, and obtains a detection result, where the timing duration of the first timer is blockage duration of a link blockage resulting from a user movement.

Specifically, in this embodiment, corresponding beamforming is performed before the first communications device and the second communications device transmit data. After the beamforming is completed, a link between the first communications device and the second communications device is established, and when the beamforming is completed, a link maintenance timer for maintaining the link is enabled and counts down. The first timer in this embodiment of this application is different from the link maintenance timer. The timing duration of the first timer in this embodiment may be set to t. The timing duration of the first timer is blockage duration of a link blockage (human blockage) resulting from a user movement. For example, in a scenario of an office conference room, an AP communicates with a plurality of STAs, and if a user moves and blocks a beam between the AP and a STA, the timing duration of the first timer is a time length from a moment at which the user starts to block the beam between the AP and the STA to a moment at which the user leaves the beam between the AP and the STA. Optionally, in a human blockage scenario, beams with different widths are corresponding to different lengths of duration of the first timer. For details, refer to subsequent embodiments, and details are not described herein again.

Optionally, the preset condition may be a quality threshold preset by a communications system, for example, a parameter such as a signal-to-noise ratio or receiving sensitivity. When the first communications device determines that the link quality does not meet the preset condition, the first communications device learns that the current link quality is degraded, and then the first communications device detects, within the timing duration of the first timer, whether the link is restored, and obtains the detection result. Optionally, the first communications device may send a detection packet of any type to detect whether the link is restored, or may use another manner to detect whether the link is restored. A manner in which the first communications device detects link restoration is not limited in this embodiment of this application.

S102. The first communications device determines, based on the detection result, whether to perform a link restoration operation.

The link restoration operation includes at least one of a beam tracking operation, a beam refinement operation, or a redo-beamforming operation.

Specifically, after the first communications device obtains the detection result, the first communications device may determine, based on the detection result, whether to perform the subsequent link restoration operation, for example, determine whether to perform at least one of the subsequent beam tracking operation, the subsequent beam refinement operation, or the subsequent redo-beamforming operation. Optionally, if the first communications device detects restoration of the link before the first timer expires, the first communications device may determine that the current link quality degradation probably results from a human blockage, and the link automatically returns to normal after the short human blockage. In this case, the first communications device does not need to perform the subsequent link restoration operation, thereby reducing some link restoration overheads.

According to the link restoration method provided in this embodiment of this application, when the quality of the link between the first communications device and the second communications device is degraded, the first communications device detects, within the timing duration of the first timer, whether the link is restored, and determines, based on the detection result obtained through the detection, whether to perform the link restoration operation. Therefore, a case in which a link restoration operation is blindly performed to restore a link in a scenario in which quality of the link is degraded for a short time due to a human blockage and is restored later can be avoided. In other words, determining can be comprehensively performed with reference to an actual situation of current link quality degradation in the embodiments of this application, thereby greatly improving link restoration accuracy.

FIG. 3 is a schematic flowchart of Embodiment 2 of the link restoration method according to the embodiments of this application. This embodiment relates to a specific process in which the first communications device detects, within the timing duration of the first timer by using a null data packet (Null Data Packet, NDP for short), whether the link is restored. On the basis of the foregoing embodiment, the method further includes the following steps.

S201. The first communications device sends an NDP to the second communications device.

Optionally, after the first communications device determines that the current link quality does not meet the preset condition, the first communications device sends the NDP to the second communications device. Optionally, the first communications device may send the NDP to the second communications device at an interval, where duration of the interval needs to be greater than duration taken by the second communications device to return response information to the first communications device. In this way, the first communications device can be prevented from sending an unwanted NDP. To be specific, if the duration of the interval at which the first communications device sends the NDP to the second communications device is less than the duration taken by the second communications device to return the response information to the first communications device, a next NDP arrives at the second communications device before the second communications device responds to a previous received NDP. Consequently, the second communications device cannot return a response message to the first communications device for a long time, affecting a link detection result of the first communications device.

If the first communications device does not receive a response message of the second communications device in one sending period, the first communications device continues sending the NDP to the second communications device till the first timer expires.

S202. If the first communications device receives, before the first timer expires, response information sent by the second communications device, determine that the link is restored.

Certainly, if the first communications device still does not receive the response information of the second communications device when the first timer expires, the first communications device determines that the link is not restored. Optionally, the first communications device may further determine that the current link quality degradation probably does not result from the human blockage but results from another reason such as deep fading. In this case, the first communications device may attempt to restore the link quality by using a corresponding operation such as beam tracking or beam refinement.

The foregoing NDP is an extremely short null data packet, so that detection overheads consumed when the first communications device detects whether the link is restored are relatively small, and efficiency of detecting, by the first communications device, whether the link is restored is greatly improved.

Figure 4:
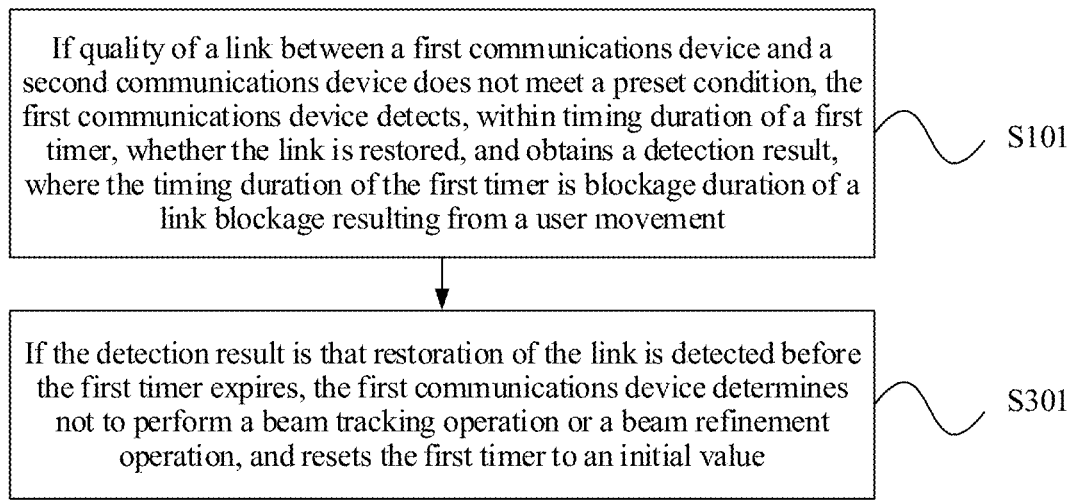
FIG. 4 is a schematic flowchart of Embodiment 3 of the link restoration method according to the embodiments of this application.
Figure 5:
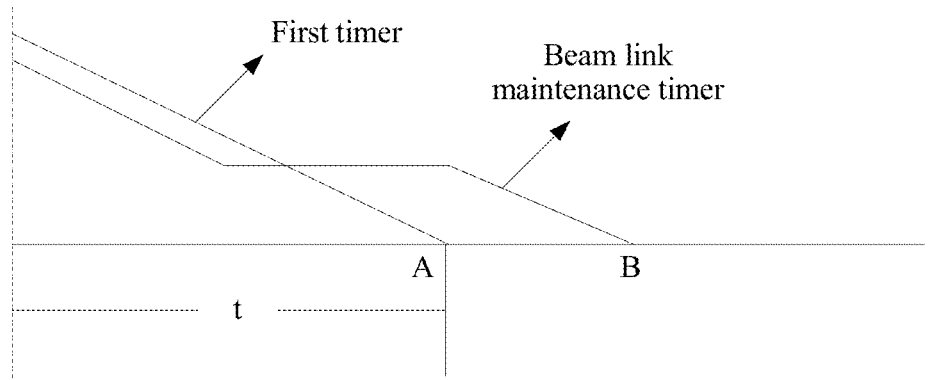
FIG. 5 is a first schematic diagram of a relationship between duration of a first timer and duration of a link maintenance timer according to an embodiment of this application.

FIG. 4 is a schematic flowchart of Embodiment 3 of the link restoration method according to the embodiments of this application. FIG. 5 is a first schematic diagram of a relationship between duration of a first timer and duration of a link maintenance timer according to an embodiment of this application. This embodiment relates to a possible implementation in which the first communications device determines, based on the detection result, whether to perform a link restoration operation. On the basis of the foregoing embodiment, S102 may include:

S301. If the detection result is that restoration of the link is detected before the first timer expires, the first communications device determines not to perform a beam tracking operation or a beam refinement operation, and resets the first tinier to an initial value.

The timing duration of the first timer (the timing duration of the first timer is set to t) is less than the timing duration of the beam link maintenance timer.

Specifically, in FIG. 5, a diagonal line on which a point A is located shows a change trend of the first timer, and the first timer expires at the point A; a diagonal line on which a point B is located shows a change trend of the link maintenance timer, and the link maintenance timer expires at the point B. Both the first timer and the link maintenance timer follow a countdown principle in a system. In addition, in the change trend of the link maintenance timer, the link maintenance timer stops timing when a non-self data transmission time period arrives. Correspondingly, the change trend of the link maintenance timer includes a short steady trend in which timing of the timer is paused.

When the first communications device detects, by sending the NDP to the second communications device, restoration of the link before the first timer expires, because the duration of the first tinier is related to a human blockage, the first communications device can determine that the current link quality degradation probably results from a human blockage. When the human blockage disappears, the link quality is quickly restored. Therefore, in this case, the first communications device determines to skip performing the beam tracking operation or the beam refinement operation, thereby greatly reducing link restoration overheads. Meanwhile, the first communications device resets the first timer and the link maintenance timer to initial values, and starts transmission of a new packet.

In the link restoration method provided in this embodiment of this application, when the first communications device detects restoration of the link before the first timer expires, the first communications device determines to skip performing the beam tracking operation or the beam refinement operation, so that the first communications device is prevented from blindly performing the beam tracking operation or the beam refinement operation when a human blockage occurs, thereby greatly reducing link restoration overheads.

Optionally, referring to FIG. 5, when the first communications device detects, by sending the NDP to the second communications device, that the link is not restored when the first timer expires, the first communications device may determine that the current link quality degradation probably does not result from a human blockage but results from another reason such as deep fading. In this case, the first communications device may attempt to restore the link quality by using a corresponding beam tracking operation or a corresponding beam refinement operation. For example, the first communications device implements STA-STA BF by requesting a service period (SP) from a PCP or an AP during an announce transmission interval (ATI) in a period from A to B, or implements STA-STA BF by obtaining a contention based access period (CBAP) during a data transmission interval (DTI), or implements AP-STA BF through associated beamforming training (A-BFT).

Certainly, if the link quality still cannot be restored by using the beam tracking operation or the beam refinement operation when the link maintenance timer in FIG. 5 expires (that is, the period from A to B ends), the first communications device starts to wait for a redo-beamforming opportunity, and immediately performs redo-beamforming when the redo-beamforming opportunity arrives.

Figure 6:
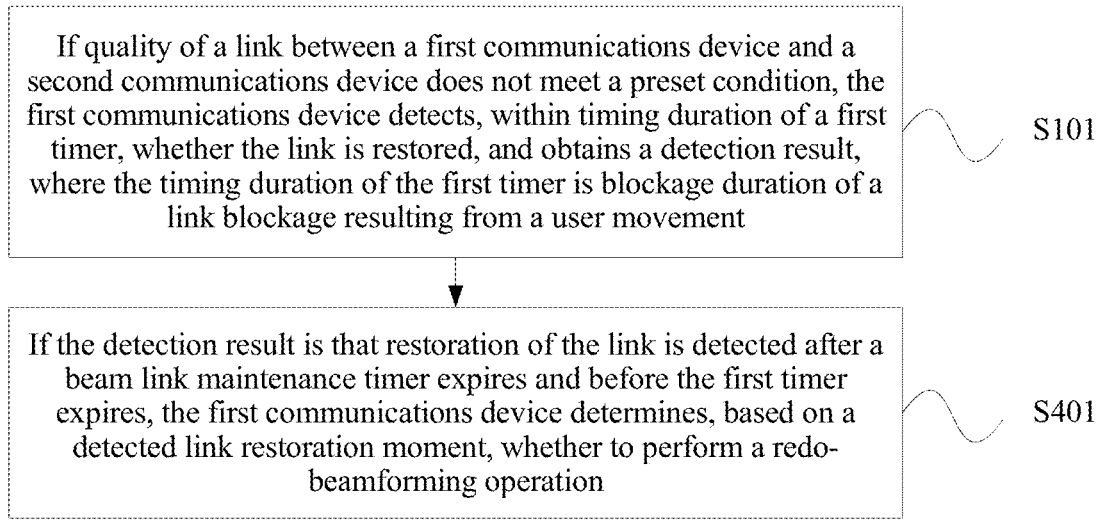
FIG. 6 is a schematic flowchart of Embodiment 4 of the link restoration method according to the embodiments of this application.
Figure 7:
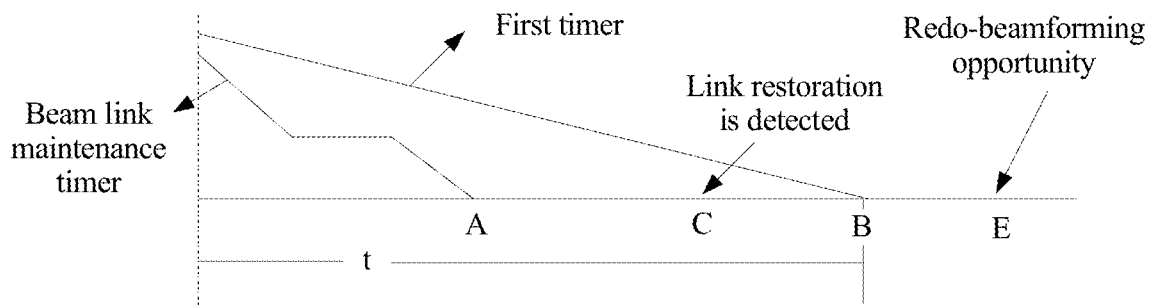
FIG. 7 is a second schematic diagram of a relationship between duration of a first timer and duration of a link maintenance timer according to an embodiment of this application.

FIG. 6 is a schematic flowchart of Embodiment 4 of the link restoration method according to the embodiments of this application. FIG. 7 is a second schematic diagram of a relationship between duration of a first timer and duration of a link maintenance timer according to an embodiment of this application. In this embodiment, the timing duration of the first timer is greater than the timing duration of the link maintenance timer. This embodiment relates to another possible implementation in which the first communications device determines, based on the detection result, whether to perform a link restoration operation. On the basis of the foregoing embodiment, S102 may include:

S401. If the detection result is that restoration of the link is detected after a beam link maintenance timer expires and before the first timer expires, the first communications device determines, based on a detected link restoration moment, whether to perform a redo-beamforming operation.

Specifically, in FIG. 7, a diagonal line on which a point A is located shows a change trend of the link maintenance timer, and the link maintenance timer expires at the point A; a diagonal line on which a point B is located shows a change trend of the first timer, and the first timer expires at the point B. Similarly, both the first timer and the link maintenance timer follow a countdown principle.

When the first communications device determines that the link quality does not meet the preset condition, the first communications device starts to detect, by using an NDP, whether the link is restored. If the first communications device does not detect restoration of the link before the beam link maintenance timer expires, the first communications device may perform link restoration by using a corresponding beam tracking or beam refinement operation before the point A in FIG. 7. If the first communications device detects, when the link maintenance timer expires, that the link is still not restored, and detects restoration of the link in a time period after the link maintenance timer expires and before the first timer expires, the first communications device may determine, based on the detected link restoration moment, whether to perform redo-beamforming.

Optionally, if the link restoration moment detected by the first communications device is prior to an enabling moment of the redo-beamforming operation, the first communications device determines to skip performing the redo-beamforming operation. In other words, if the first communications device detects restoration of the link before the redo-beamforming opportunity arrives, the first communications device determines that currently the redo-beamforming operation does not need to be performed. Referring to a point C and a point E in FIG. 7, it is assumed that the first communications device detects restoration of the link at the point C, and the first communications device obtains the redo-beamforming opportunity at the point E. In this scenario, if the first communications device detects restoration of the link at the point C, the redo-beamforming operation does not need to be performed at the point E.

Figure 8:
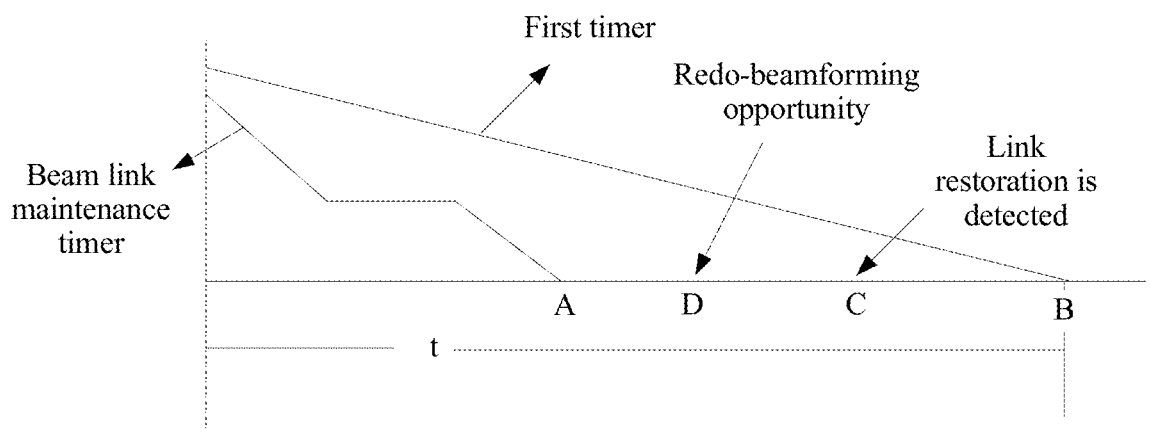
FIG. 8 is a third schematic diagram of a relationship between duration of a first timer and duration of a link maintenance timer according to an embodiment of this application.

Optionally, referring to FIG. 8, FIG. 8 is a third schematic diagram of a relationship between duration of a first timer and duration of a link maintenance timer. In FIG. 8, the timing duration of the first timer is still greater than the timing duration of the link maintenance timer. In FIG. 8, if the first communications device does not detect restoration of the link before the redo-beamforming operation is enabled, the first communications device determines to perform the redo-beamforming operation, and when detecting restoration of the link, transmits data by using an initial beam parameter used before the redo-beamforming. Further referring to a point D and a point C shown in FIG. 8, the first communications device detects restoration of the link at the point C, and the first communications device obtains the redo-beamforming opportunity at the point D prior to the point C. Therefore, the first communications device first performs redo-beamforming. To be specific, in a time period from D to C, the first communications device and the second communications device transmit data by using a beam parameter (BF pattern) obtained after the redo-beamforming; and as time goes by, when the first communications device detects restoration of the link at the point C, the first communications device uses an original BF pattern (namely, the initial beam parameter) in transmission after the point C and no longer uses the BF pattern at the point D. Optionally, the foregoing beam parameter may include a physical direction of a beam, a beam width and granularity in digital beamforming, and the like.

Optionally, referring to FIG. 9, FIG. 9 is a fourth schematic diagram of a relationship between duration of a first timer and duration of a link maintenance timer. In FIG. 9, the timing duration of the first timer is greater than the duration of the link maintenance timer. In FIG. 9, if the first communications device does not detect restoration of the link and a redo-beamforming operation is not enabled when the first timer expires (that is, ends at a point B), the first communications device stops link detection and waits to perform a redo-beamforming operation. In other words, if the first communications device still does not detect restoration of the link and does not obtain a redo-beamforming opportunity at the point B, the first communications device stops sending an NDP to the second communications device, continues to wait for the redo-beamforming opportunity, and performs redo-beamforming when the redo-beamforming opportunity (namely, a point E in FIG. 9) arrives.

Optionally, referring to FIG. 10, FIG. 10 is a fifth schematic diagram of a relationship between duration of a first timer and duration of a link maintenance timer. In FIG. 10, the timing duration of the first timer is greater than the duration of the link maintenance timer. In FIG. 10, if the first communications device does not detect restoration of the link when the first timer expires, and if the redo-beamforming operation is enabled after the beam link maintenance timer expires and before the first timer expires (that is, a point D in FIG. 10), a BF pattern (beamforming parameter) obtained at the point D may be used in transmission after the point D. In other words, data may be transmitted after the point D by using a beam parameter obtained after the redo-beamforming.

Optionally, the foregoing first timer is enabled when data transmission between the first communications device and the second communications device starts. The timing duration of the first timer is set to blockage duration of a human blockage during enabling. In addition, the first communications device resets the first timer when the first communications device transmits first information. Optionally, the first information may include at least one of an immediate response, a service period request, a polling frame, an authorization frame, a request frame, an acknowledgement (ACK) frame, a block acknowledgement (BA) frame, a directional multi-gigabit deny-to-send (DMG-DTS) frame, a directional multi-gigabit clear-to-send (DMG-CTS) frame. For example, when a transmit end receives an immediate response, an ACK, a BA, DMG CTS, or DMG DTS, a value of the first timer is set to the blockage duration of the human blockage. Alternatively, after a receive end sends an immediate response, an ACK, a BA, DMG CTS, or DMG DTS, a value of the first timer is set to the blockage duration of the human blockage.

In the link restoration method provided in this embodiment of this application, when the first communications device detects restoration of the link in a time period after the link maintenance timer expires and before the first timer expires, and a link restoration moment is prior to an enabling moment of the redo-beamforming operation, the first communications device determines to skip performing the redo-beamforming operation, so that the first communications device is prevented from blindly performing a redo-beamforming operation with relatively large communication overheads in a scenario of link quality degradation resulting from a human blockage, thereby greatly reducing signaling overheads of link restoration.

FIG. 11 is a schematic flowchart of Embodiment 5 of the link restoration method according to the embodiments of this application. This embodiment relates to a specific process in which the first communications device and the second communications device obtain timing duration of a first timer. On the basis of the foregoing embodiment, before S101, the method may further include the following steps.

S501. The first communications device determines the timing duration of the first timer based on a current communication scenario.

The communication scenario includes any one of a blockage scenario of a home living room, a blockage scenario of dense wearables use in airplane, and a blockage scenario of an office conference room.

S502. The first communications device sends the timing duration of the first timer to the second communications device.

Specifically, before the first communications device performs beamforming with the second communications device, or before the quality of the link between the first communications device and the second communications device does not meet the preset condition, the first communications device may determine, with reference to the current communication scenario of the first communications device, a value of the timing duration of the first timer when a human blockage occurs in the scenario. Optionally, in different communication scenarios, when a human blockage occurs, each communication scenario is corresponding to one first timer. Optionally, the mapping relationship may be integrated inside the first communications device, or may be uploaded to a network element device that manages the first communications device and the second communications device. When the first communications device needs to transmit data with the second communications device, the first communications device may obtain, from the network element device, timing duration of a first timer corresponding to a current communication scenario.

Optionally, the timing duration of the first timer is usually obtained by a data initiator. In other words, a party who currently needs to transmit data detects whether the link quality is degraded, and then determines timing duration of a first timer corresponding to a current communication scenario. That the first communications device is the data initiator is used as an example in this embodiment of this application. In this case, the first communications device obtains the timing duration of the first timer, and further sends the obtained timing duration of the first timer to the second communications device. Optionally, the first communications device may add the timing duration of the first timer to a communication frame, and send the communication frame to the second communications device. The communication frame may include any one of a probe frame, an announce frame, an information request frame, and a response frame. Optionally, if the first communications device is an AP and the second communications device is a STA, the AP adds the timing duration of the first timer to an announce frame and broadcasts the announce frame to the STA at a receive end. If both the first communications device and the second communications device are STAs, the first communications device may notify the second communications device of the timing duration of the first timer by using a probe frame.

Optionally, the foregoing communication scenario may be a blockage scenario of a home living room. Referring to a schematic diagram of a communication scenario shown in FIG. 12, the blockage scenario of a home living room may be: A user moves in a home living room, resulting in a human blockage between a set top box (STB) and a television TV. In this scenario, the first communications device may be the STB, the second communications device may be the TV, the STB sends a mildly compressed video, and the television TV receives the video.

Optionally, the foregoing communication scenario may be a blockage scenario of dense wearables use in airplane. Referring to the communication scenario shown in FIG. 13, in the scenario of dense wearables use in airplane, it is assumed that many passengers on the airplane use high-end wearables (wearable devices) for entertainment, and the passengers use head-mounted high-end wearables to transmit data with their mobile phones. Types of transmitted data include a compressed video, an interactive game, and the like. Two cases are common in this scenario: A. The head-mounted device may be placed on a front side of a head, and an antenna is disposed on a left/right side or a back side of the head-mounted device; B: A smartphone of a user may be placed on a seat or beside the user's body. A human blockage in this case is specifically a human blockage between the high-end wearables and the smartphone that probably results from a person's body movement (for example, head shaking).

Optionally, the foregoing communication scenario may be a blockage scenario of an office conference room. Referring to a schematic diagram of a communication scenario shown in FIG. 14, in this scenario, a STA may be a notebook computer or a smartphone, one STA is connected to a projector, a plurality of STAs are connected to an AP, and STAs transmit files to each other. For example, a STA 3 and a STA 5 transmit files to each other. The STA 3 and the STA 5 may directly communicate with each other or perform transmission by using the AP. The AP may be disposed in a ceiling above a door. A STA 2 and a STA 8 are smartphones, and remaining STAs are notebook computers. All STAs are placed on a desktop. Because the STAs are placed on the desktop, a human blockage between STAs may occur due to a person's body movement (such as arm waving), and a blockage between the AP and a STA may occur due to a human body passing by. However, because the AP in the ceiling is relatively high, only a STA that is relatively close to the AP may be affected by the human blockage.

Figure 12:
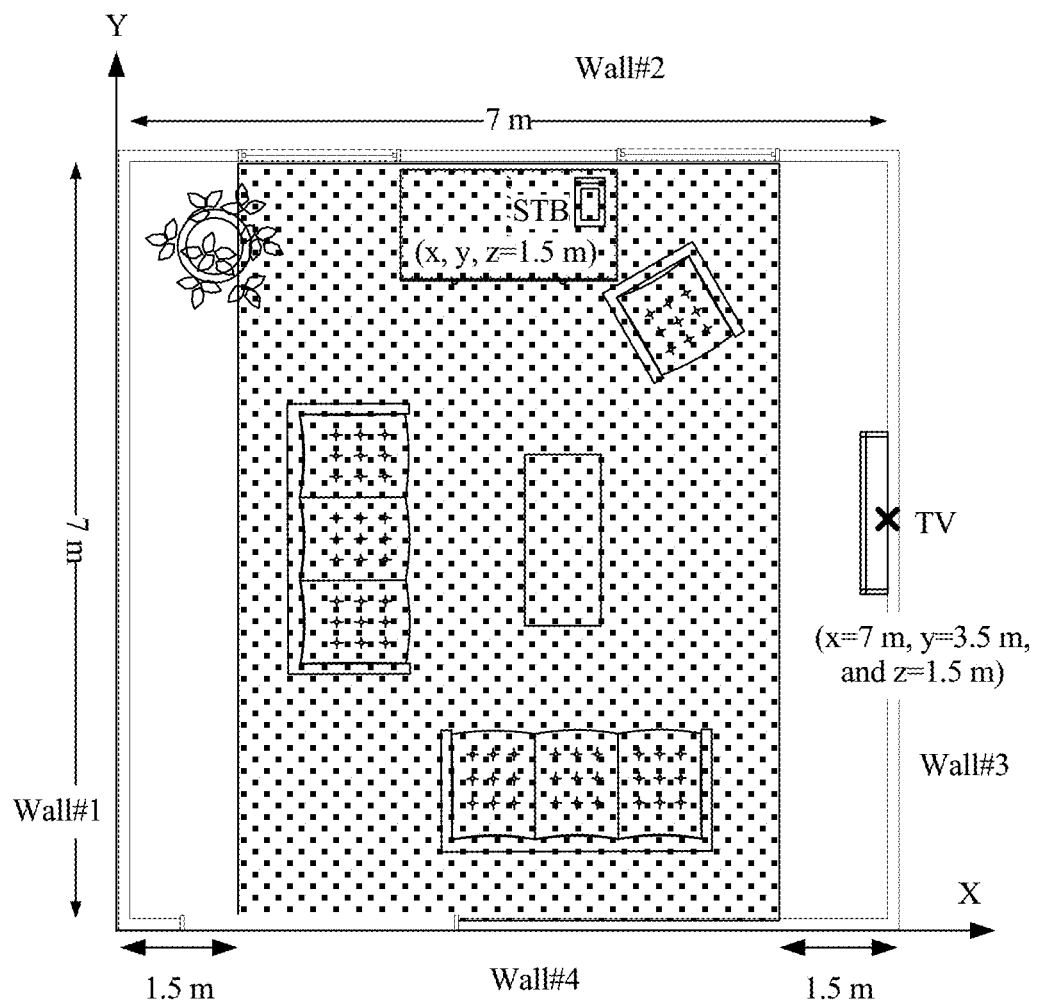
FIG. 12 is a schematic diagram of a scenario of a home living room according to an embodiment of this application.
Figure 13:
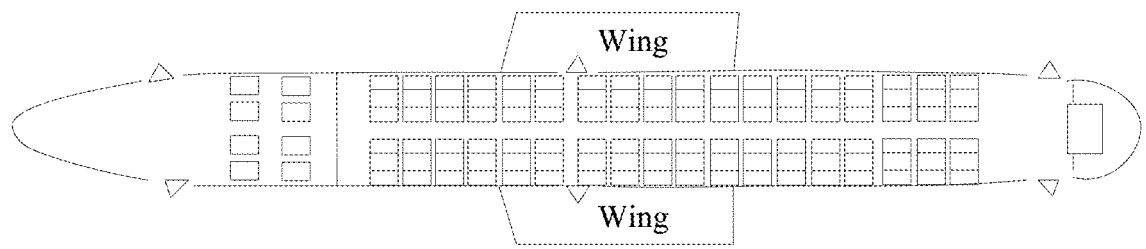
FIG. 13 is a schematic diagram of a scenario of dense wearables use in airplane according to an embodiment of this application.
Figure 14:
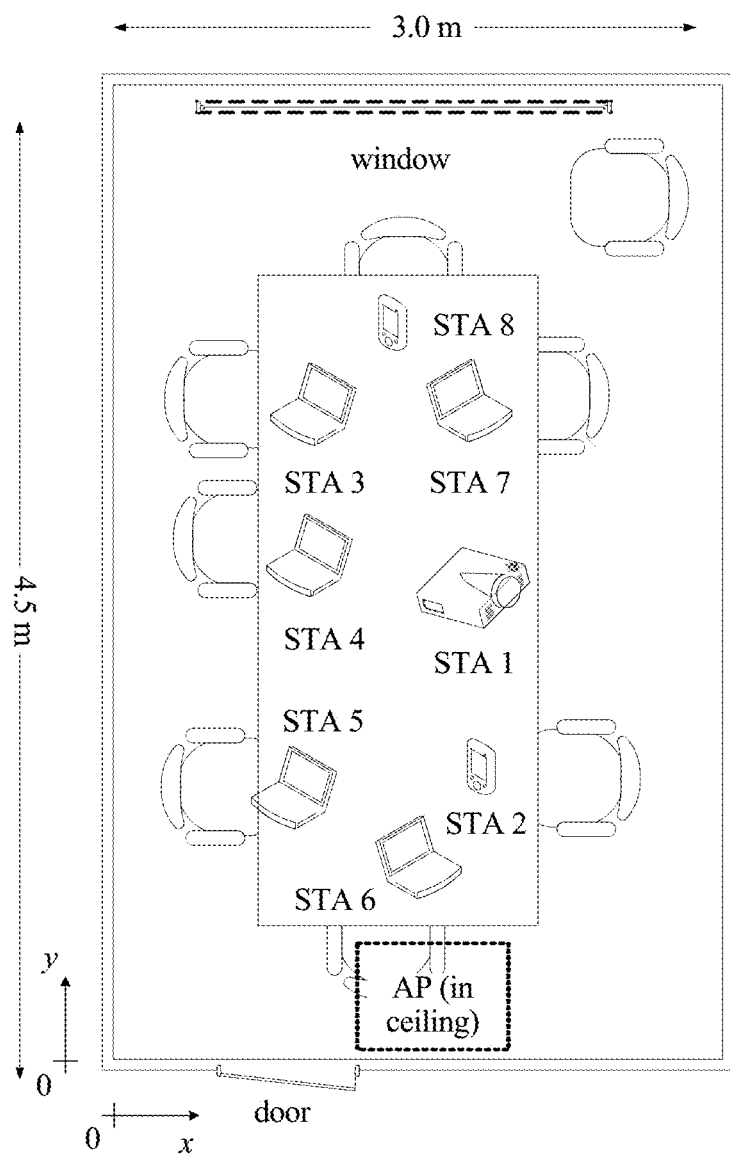
FIG. 14 is a schematic diagram of a scenario of an office conference room according to an embodiment of this application.

Certainly, scenario settings in FIG. 12 to FIG. 14 are merely examples and are not limited in this embodiment.

The following possible implementations respectively describe processes of obtaining the timing duration of the first timer when a human blockage occurs in FIG. 12 to FIG. 14. Similarly, the following obtaining processes are also merely examples. Optionally, the obtaining process may be performed by a network element device that manages the first communications device and the second communications device, or may be performed by the first communications device or the second communications device. This is not limited in this embodiment.

In a first possible implementation:

This embodiment relates to a specific process of obtaining blockage duration resulting from a human blockage in a scenario of a home living room shown in FIG. 12.

Referring to FIG. 12, a length of each of four walls is 7 m, a height of a room is 3 m, a position of an STB in the room is 1.5 m*1.5 m*1.5 m, and a position of a TV in the room is 7 m*3.5 m*1.5 m. It can be learned that the STB and the TV are at a same height of 1.5 m. It is assumed that transmission between the STB and the TV is a line-of-sight (LOS) path transmission. When a person walks inside the room, a height of the person is roughly equal to the height at which the STB and the TV are placed. Therefore, when the person passes the LOS path, a human blockage of the link occurs. Because of high mobility of the person in the home living room, it may be considered that a probability of occurrence of such human blockage is relatively high. The blockage duration (namely, the timing duration of the first timer) resulting from the human blockage in this scenario may be specifically classified into blockage duration at a directional narrow beam and blockage duration at a directional wide beam. For example, a beam angle of the narrow beam is 5°, and a beam angle of the wide beam is 30°. For specific calculation processes, respectively refer to a schematic diagram of a human blockage at a directional narrow beam in a scenario of a home living room shown in FIG. 15 and a schematic diagram of a human blockage at a directional wide beam in a scenario of a home living room shown in FIG. 16.

Figure 15:
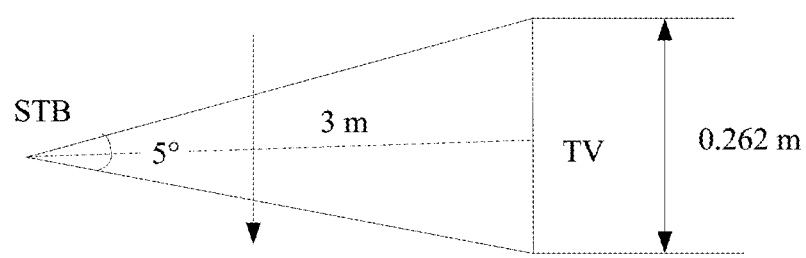
FIG. 15 is a schematic diagram of a human blockage at a directional narrow beam in a scenario of a home living room according to an embodiment of this application.

Referring to FIG. 15, it is assumed that a distance between the STB and the TV is 3 m, the STB and the TV are at a same height, a LOS path lies between the STB and the TV, and a walking speed of a person is 3 km/h:

(1) If the person walks across a beam in the middle of the beam (at a distance of 1.5 meter away from the STB), blockage duration of a human blockage is:

$$t = \frac{2 \times (1.5 \times (\tan 2.5))}{(3000/3600)} = 0.13/0.83 = 157.2 \text{ ms}$$

(2) If the person walks across the beam at a distance of 1 meter away from the STB, blockage duration of a human blockage is:

$$t = \frac{2 \times (1 \times (\tan 2.5))}{(3000/3600)} = 0087/0.83 = 104.8 \text{ ms}$$

(3) If the person walks across the beam at a distance of 1 meter away from the TV (2 meters away from the STB), blockage duration of a human blockage is:

$$t = \frac{2 \times (2 \times (\tan 2.5))}{(3000/3600)} = 0.175/0.83 = 209.7 \text{ ms}$$

Figure 16:
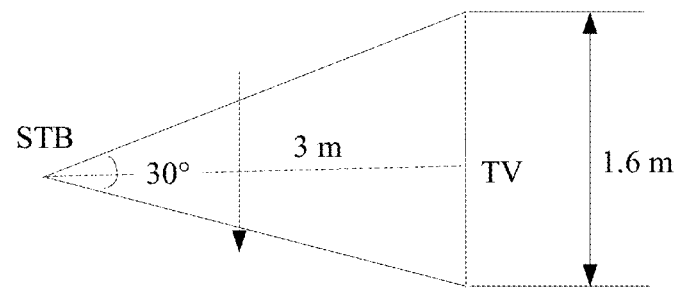
FIG. 16 is a schematic diagram of a human blockage at a directional wide beam in a scenario of a home living room according to an embodiment of this application.

Referring to FIG. 16, it is also assumed that a distance between the STB and the TV is 3 m, the STB and the TV are at a same height, a LOS path lies between the STB and the TV, and a walking speed of a person is 3 km/h:

(1) If the person walks across a beam by the middle of the beam (at a distance of 1.5 meter away from the STB), blockage duration of a human blockage is:

$$t = \frac{2 \times (1.5 \times (\tan 15))}{(3000/3600)} = 0.8/0.83 = 964.6 \text{ ms}$$

(2) If the person walks across the beam at a distance of 1 meter away from the STB, blockage duration of a human blockage is:

$$t = \frac{2 \times (1 \times (\tan 15))}{(3000/3600)} = 0.536/0.83 = 643.1 \text{ ms}$$

(3) If the person walks across the beam at a distance of 1 meter away from the TV (that is, 2 meters away from the STB), blockage duration of a human blockage is:

$$t = \frac{2 \times (2 \times (\tan 15))}{(3000/3600)} = 1.072/0.83 = 1286.2 \text{ ms}$$

In conclusion, it can be learned that, in the scenario of a home living room, duration of a human blockage between the STB and the TV at a narrow beam approximately ranges from 100 ms to 200 ms. The timing duration of the first timer is close to that of the link maintenance timer in order of magnitude. Duration of a human blockage between the STB and the TV at a wide beam approximately ranges from 600 ms to 1280 ms, and the timing duration of the first timer is greater than duration of the link maintenance timer.

In a second possible implementation:

This embodiment relates to a specific process of obtaining blockage duration resulting from a human blockage in a scenario of dense wearables use in airplane shown in FIG. 13. The blockage duration (namely, the timing duration of the first timer) resulting from the human blockage in this scenario may also be classified into blockage duration at a directional narrow beam and blockage duration at a directional wide beam. For example, a beam angle of the narrow beam is 5°, and a beam angle of the wide beam is 30°. It is assumed that a moving speed of a human body is 1 m/s, a mobile phone is placed on a chair and high-end wearables are worn on a head, and a LOS path between the high-end wearables and the passenger's mobile phone is approximately 0.6 m. A specific calculation process is as follows:

When the beam angle is 5° and the person's arm waves through the LOS path, refer to the foregoing calculation processes in FIG. 15 and FIG. 16 for a manner of calculating the blockage duration resulting from the human blockage, that is, the blockage duration is:

$$t = \frac{2 \times \left((\tan 2.5) \times \frac{0.6}{2}\right)}{1} = 26.197 \text{ ms}$$

When the beam angle is 30° and the person's arm waves through the LOS path, refer to the foregoing calculation processes in FIG. 15 and FIG. 16 for a manner of calculating the blockage duration resulting from the human blockage, that is, the blockage duration is:

$$t = \frac{2 \times \left((\tan 15) \times \frac{0.6}{2}\right)}{1} = 160.770 \text{ ms}$$

In conclusion, it can be learned that in the scenario of dense wearables use in airplane, duration of a human blockage between STAs at a narrow beam is approximately 26 ms, and is less than the timing duration of the link maintenance timer, and duration of a human blockage between STAs at a wide beam is approximately 160 ms, and is greater than the timing duration of the link maintenance timer.

In a third possible implementation:

This embodiment relates to a specific process of obtaining blockage duration resulting from a human blockage in a scenario of an office conference room shown in FIG. 14. The blockage duration (namely, the timing duration of the first timer) resulting from the human blockage in this scenario may also be classified into blockage duration at a directional narrow beam and blockage duration at a directional wide beam. For example, a beam angle of the narrow beam is 5°, and a beam angle of the wide beam is 30°. In addition, in this scenario, the blockage duration at the directional narrow beam may be classified into blockage duration resulting from a human blockage occurring on a LOS path between STAs and blockage duration resulting from a human blockage occurring on a LOS path between a STA and an AP. Similarly, the blockage duration at the directional wide beam may also be classified into blockage duration resulting from a human blockage occurring on a LOS path between STAs and blockage duration resulting from a human blockage occurring on a LOS path between a STA and an AR In the following calculation process, it is assumed that a moving speed of a human body is 1 m/s, and a specific process is as follows:

(1) For a manner of calculating the blockage duration resulting from a human blockage occurring on a LOS path between STAs at the directional narrow beam, refer to the foregoing calculation processes in FIG. 15 and FIG. 16, that is, the blockage duration is:

a: It is assumed that the person's arm waves through the middle of a STA 1 and a STA 2, and a distance between the STA 1 and the STA 2 that is calculated based on coordinates is 0.6625 m. In this case, the duration of the human blockage is:

$$t = \frac{2 \times \left((\tan 2.5) \times \frac{0.6625}{2}\right)}{1} = 0.0289/1 = 28.9 \text{ ms}$$

b: It is assumed that the person's arm waves through the middle of a STA 7 and a STA 8, and a distance between the STA 7 and the STA 8 that is calculated based on coordinates is 0.3536 m. In this case, the duration of the human blockage is:

$$t = \frac{2 \times \left((\tan 2.5) \times \frac{0.3536}{2}\right)}{1} = 0.0154/1 = 15.4 \text{ ms}$$

c: It is assumed that the person's arm waves through the middle of a STA 5 and a STA 7, and a distance between the STA 5 and the STA 7 that is calculated based on coordinates is 1.6 m. In this case, the duration of the human blockage is:

$$t = \frac{2 \times \left((\tan 2.5) \times \frac{1.6}{2}\right)}{1} = 0.0698/1 = 69.8 \text{ ms}$$

Figure 17:
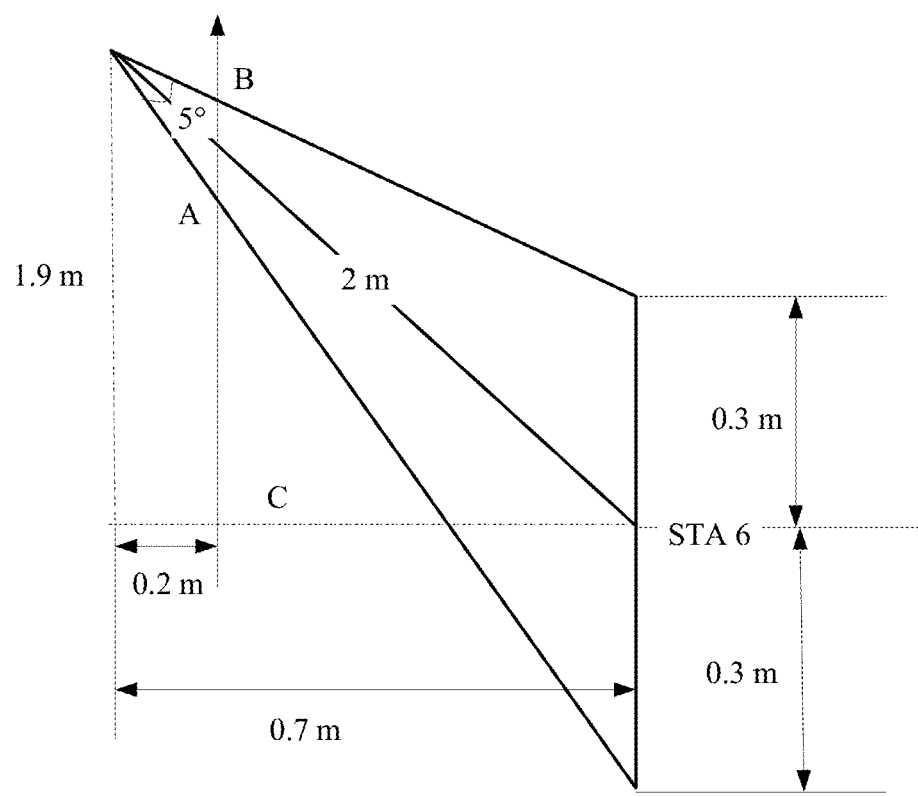
FIG. 17 is a first schematic diagram of a human blockage at a directional narrow beam in a scenario of an office conference room according to an embodiment of this application.

(2) When a distance between an AP and a STA is relatively short at the directional narrow beam, referring to FIG. 17, FIG. 17 is a first schematic diagram of a human blockage at a directional narrow beam in a scenario of an office conference room, and a LOS distance between an AP and a STA 6 is approximately 2 m. If a beam angle is 5°, a radius of a beam reaching the STA 6 is approximately 0.3 m. It is assumed that a user passes behind a chair facing the STA 6 (namely, a point C in FIG. 17). In this case, a horizontal distance between the person and the STA 6 is 0.5 m, and a distance between the AP and the ground is 1.9 m. Because AC=1.27 m<adult height (AC is a distance between an edge of the beam to the ground), when the person passes C (in other words, the person walks from A to B), a human blockage occurs on a LOS path between the AP and the STA 6. It is assumed that a walking speed of the person is 3 km/h, blockage duration resulting from the human blockage occurring on the LOS path between the STA and the AP is:

$$t = \frac{\left(\frac{0.2}{0.7}\right) \times 0.6}{3000/3600} = 205.7 \text{ ms}$$

Figure 18:
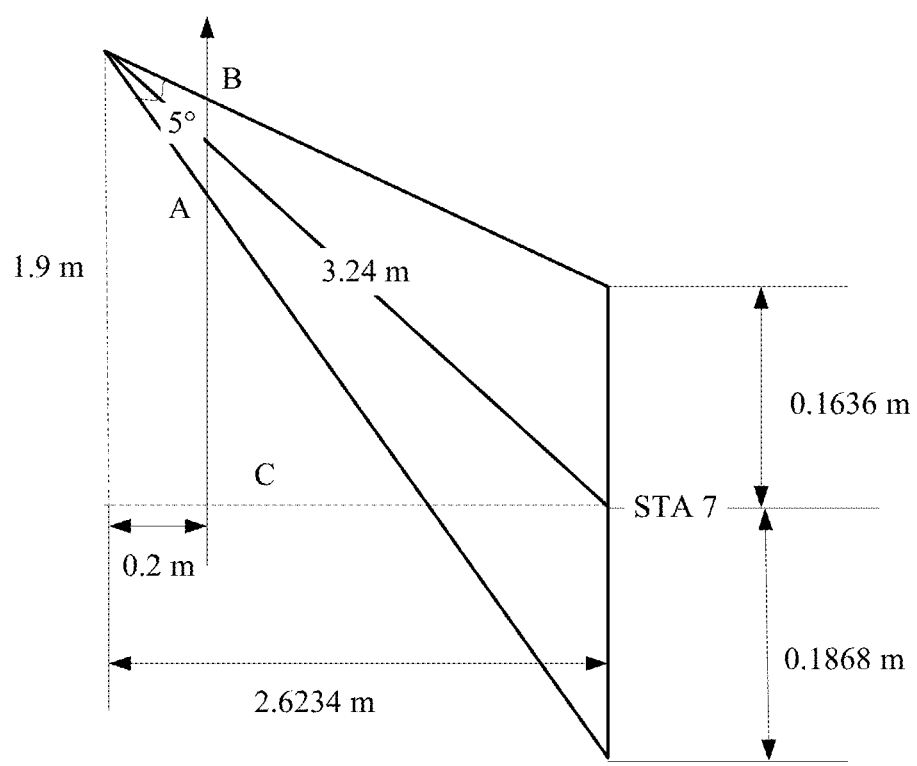
FIG. 18 is a second schematic diagram of a human blockage at a directional narrow beam in a scenario of an office conference room according to an embodiment of this application.

In addition, when a distance between the AP and the STA is relatively long, referring to FIG. 18, FIG. 18 is a second schematic diagram of a human blockage at a directional narrow beam in a scenario of an office conference room, and a length of a LOS path between an AP and a STA 7 that is calculated based on coordinates is approximately 3.24 m. If a beam angle is 5°, a radius of a beam reaching the STA 7 is approximately 0.17 m. It is assumed that a user still passes behind the chair facing the STA 6 (namely, a point C in FIG. 18). In this case, a horizontal distance between the person and the STA 7 is 2.4 m, and a distance between the AP and the ground is 1.9 m. Because AC=1.755 m (AC is a distance between an edge of the beam to the ground), that is, when the person passes C (in other words, the person walks from A to B), the beam is blocked only when the person is higher than 1.75 m, a probability that the beam is blocked due to a person's movement in this case is relatively small, and this case may not be considered.

(3) For a manner of calculating the blockage duration resulting from a human blockage occurring on a LOS path between STAs at the directional wide beam, refer to the foregoing calculation processes in FIG. 15 and FIG. 16, that is, the blockage duration is:

a: It is assumed that the person's arm waves through the middle of a STA 1 and a STA 2, and a distance between the STA 1 and the STA 2 that is calculated based on coordinates is 0.6625 m. In this case, the duration of the human blockage is:

$$t = \frac{2 \times \left((\tan 15) \times \frac{0.6625}{2}\right)}{1} = 0.1775/1 = 177.5 \text{ ms}$$

b: It is assumed that the person's arm waves through the middle of a STA 7 and a STA 8, and a distance between the STA 7 and the STA 8 that is calculated based on coordinates is 0.3536 m. In this case, the duration of the human blockage is:

$$t = \frac{2 \times \left((\tan 15) \times \frac{0.3536}{2}\right)}{1} = 0.0947/1 = 94.7 \text{ ms}$$

c: It is assumed that the person's arm waves through the middle of a STA 5 and a STA 7, and a distance between the STA 5 and the STA 7 that is calculated based on coordinates is 1.6 m. In this case, the duration of the human blockage is:

$$t = \frac{2 \times \left((\tan 15) \times \frac{1.6}{2}\right)}{1} = 4287/1 = 428.7 \text{ ms}$$

Figure 19:
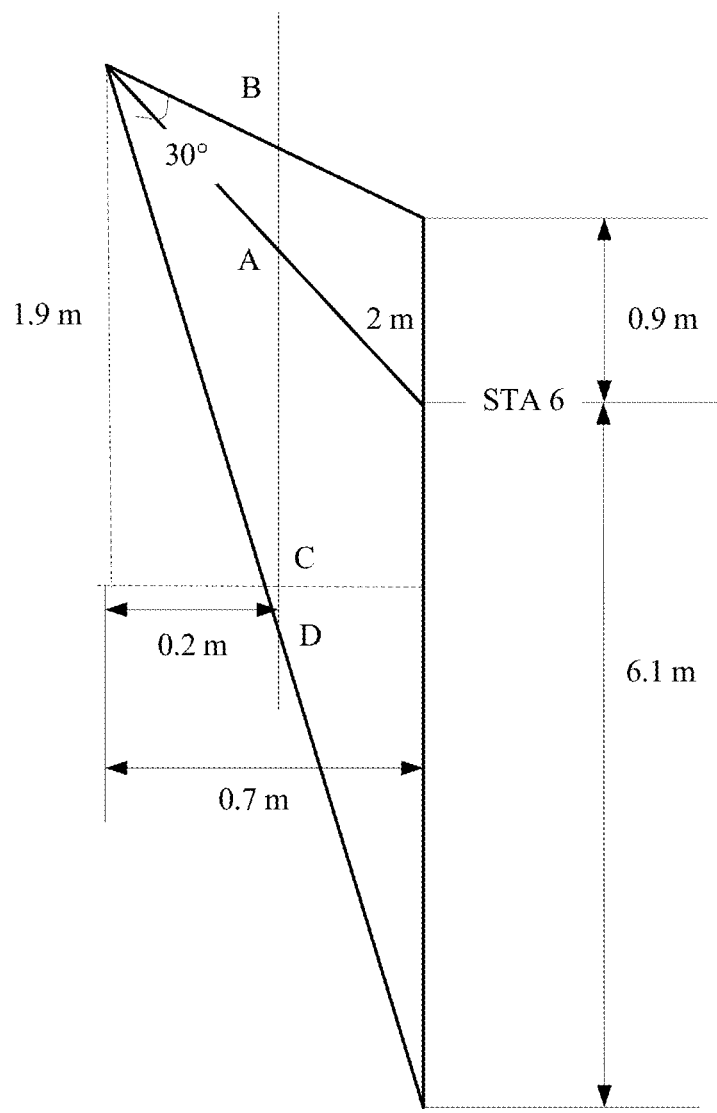
FIG. 19 is a first schematic diagram of a human blockage at a directional wide beam in a scenario of an office conference room according to an embodiment of this application.

(4) When a distance between an AP and a STA is relatively short at the directional wide beam, referring to FIG. 19, FIG. 19 is a first schematic diagram of a human blockage at a directional wide beam in a scenario of an office conference room, and a length of a LOS path between an AP and a STA 6 that is calculated based on coordinates is approximately 2 m. If an angle of the beam is 30°, and it is assumed that the user passes behind a chair facing the STA 6 (namely, a point C in FIG. 19), in this case, a horizontal distance between the person and the STA 6 is 0.5 m. It can be seen from FIG. 19 that the beam is fully blocked at 0.2 m (a point D in FIG. 19), and when the person passes C (that is, the person walks from D to a point B), a human blockage occurs on the LOS path between the AP and the STA 6. It is assumed that a walking speed of the person is 3 km/h, the blockage duration resulting from the human blockage occurring on the LOS path between the STA and the AP is:

$$t = \frac{\frac{0.2}{0.7} \times 7}{3000/3600} = 2.4 \text{ s}$$

Figure 20:
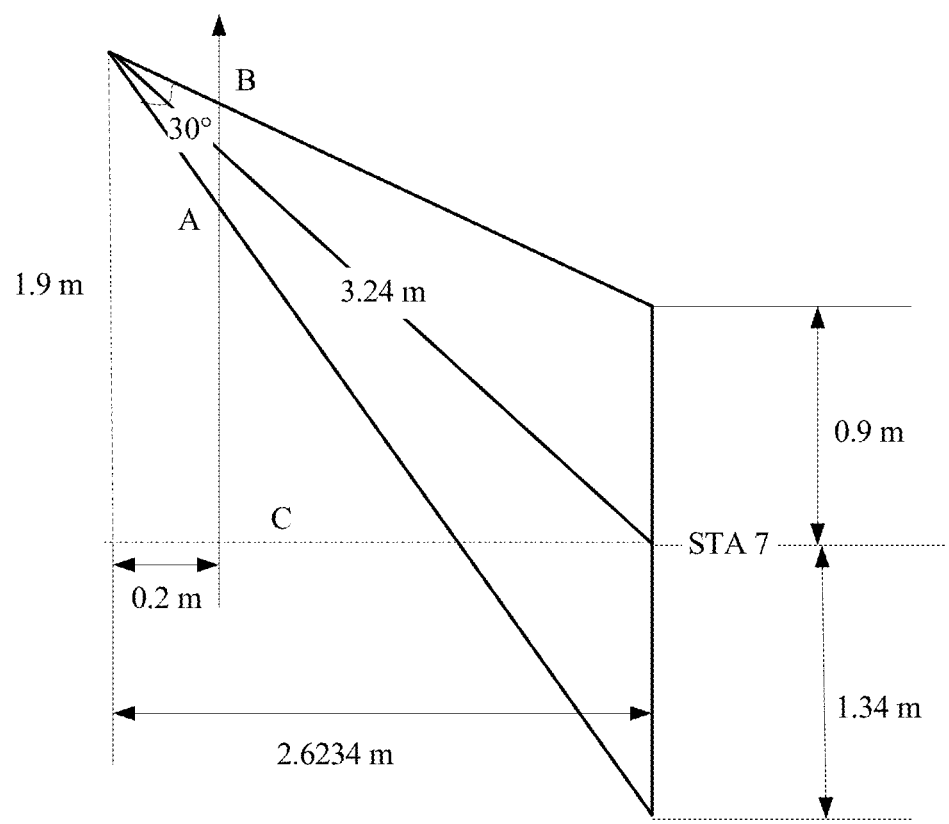
FIG. 20 is a second schematic diagram of a human blockage at a directional wide beam in a scenario of an office conference room according to an embodiment of this application.

In addition, when a distance between the AP and the STA is relatively long, referring to FIG. 20, FIG. 20 is a second schematic diagram of a human blockage at a directional wide beam in a scenario of an office conference room, and a length of a LOS path between an AP and a STA 7 that is calculated based on coordinates is approximately 3.24 m. If an angle of the beam is 30°, and it is assumed that a user still passes behind the chair facing the STA 6 (namely, a point C in FIG. 20), in this case, a horizontal distance between the person and the STA 7 is 2.4 m, and a distance between the AP and the ground is 1.9 m. Because AC=1.653 m (AC is a distance between an edge of the beam to the ground), that is, when the person passes C (in other words, the person walks from A to B), a beam is blocked only when the person is higher than 1.65 m, a probability that the beam is blocked due to a person's movement in this case is relatively small, and this case may not be considered.

In conclusion, it can be learned that in the scenario of an office conference room, the blockage duration (namely, the timing duration of the first timer) resulting from the human blockage on the LOS path between the STAs at the narrow beam ranges from 10 ms to 70 ms and is more likely to be less than that of the link maintenance timer. When a horizontal distance between an AP and a STA is relatively short, a human blockage is likely to occur due to a person's movement, and in this case, blockage duration resulting from the human blockage on the LOS path is approximately 200 ms, and is roughly equal to duration of the link maintenance timer. Duration of the human blockage on the LOS path between the STAs at the wide beam ranges from 90 ms to 430 ms, and the blockage duration resulting from the human blockage may be less than the timing duration of the link maintenance timer or may be greater than the timing duration of the link maintenance timer. The human blockage between the AP and the STA is similar to that at the narrow beam. If the horizontal distance between the AP and the STA is shorter, a blockage resulting from a human blockage is more likely to occur. In this case, blockage duration resulting from the human blockage on the LOS path is 2.4 s, and is greater than the blockage duration of the link maintenance timer.

With reference to the foregoing three scenarios, for examples of timing duration of the first timer corresponding to different communication scenarios, refer to Table 1.

other words, a frame structure of the communication frame for the first timer includes three fields: the Element ID field representing the identifier of an Element including the timing duration of the first timer, the link blockage maintenance (Link Blockage Maintenance) field, and the Length field used to represent the length of the link blockage maintenance field. Refer to Table 2 for the three fields.

TABLE 2

| Element ID | Length | Link Blockage Maintenance |
| --- | --- | --- |

In Table 2, Element ID and Length each may occupy a length of one byte in the communication frame. A value of the Length field represents the length of the Link Blockage Maintenance field. For example, in this embodiment, it is assumed that the length of the Link Blockage Maintenance field may be one byte (or certainly may be a plurality of bytes based on an actual situation), and the Link Blockage Maintenance field is used to represent timing duration of the first timer in a current communication scenario. Optionally, a value of Element ID may be selected from 191 to 220 according to specifications in Table 8-54 in 802.11ad, and Length may be set to 1.

In addition, for a structure of the Link Blockage Maintenance field, refer to the following Table 3. Certainly, the following Table 3 is also merely an example of a field structure. This is not limited in this embodiment. Refer to Table 3 below:

TABLE 1

| | Beam width | | | |
| --- | --- | --- | --- | --- |
| Scenario | Narrow beam 5° (STA-STA) | Wide beam 30° (STA-STA) | Narrow beam 5° (AP-STA) | Wide beam 30° (AP-STA) |
| Home living room | 100 ms~200 ms (Between a TV and a set top box) | 600 ms~1280 ms | | |
| Dense wearables use in airplane | 26 ms | 160 ms | | |
| Office conference room | 10 ms~70 ms | 90 ms~430 ms | 200 ms | 2.4 s |

It may be learned from the foregoing three possible implementations that different communication scenarios are respectively corresponding to corresponding lengths of timing duration of the first timer. Therefore, the first communications device may directly learn of the timing duration of the first timer based on a current communication scenario, and notify the second communications device, so as to ensure that two ends of the link use the same timer.

Further, the first communications device may add the timing duration of the first timer to a communication frame and sends the communication frame to the second communications device. The communication frame may be any one of a probe frame, an announce frame, an information request frame, and a response frame. In this embodiment, a communication frame of any type may include an Element ID field representing an identifier of the first timer, a link blockage maintenance field, and a Length field used to represent a length of the link blockage maintenance field. In

TABLE 3

| Link Blockage Maintenance Unit Index | Link Blockage Maintenance Value | Link Blockage is Master |
| --- | --- | --- |

In Table 3, Link Blockage Maintenance Unit Index field is a link blockage maintenance unit index, Link Blockage Maintenance Value field is a link blockage maintenance value, and Link Blockage is Master field is a leading party of link blockage maintenance. Optionally, the Link Blockage Maintenance field is 1 byte. Therefore, optionally, the Link Blockage Maintenance Unit Index field may occupy 2 bits, the Link Blockage Maintenance Value field may occupy 5 bits, and the Link Blockage is Master field may occupy 1 bit.

For example, the Link Blockage Maintenance Value field is 5 bits, and a value of the Link Blockage Maintenance Value field may range from 00000 to 11111. The Link Blockage Maintenance Value field is a count value of the first timer. In other words, the timer counts down from 11111, and when one unit is counted (for example, from 11111 to 11110), duration corresponding to the unit is a time of the Link Blockage Maintenance Unit Index field. The Link Blockage Maintenance Unit Index field is two bits, and may be any value among 00 to 11. Each value may represent one time value, and values of the Link Blockage Maintenance Unit Index field corresponding to different communication scenarios are different. In other words, the Link Blockage Maintenance Unit Index field is a time (which may be referred to as a unit time) for which the first timer counts down by one unit. For example, if data is transmitted between an AP and a STA, the AP may learn of a current communication scenario, and then the AP learns, based on the Link Blockage Maintenance Unit Index field, a value of a time for which the first timer counts down by one unit in the current communication scenario (for example, the time for counting down by one unit is 20 ms). It is assumed that the value of the Link Blockage Maintenance Value field is 11111. In this case, 20*31=620 ms is the timing duration of the first timer, are occupied. When the AP sends the foregoing communication frame to the STA, the STA can learn of the timing duration of the first timer by using such a frame structure.

For example, referring to Table 4, Table 4 shows unit times corresponding to different Link Blockage Maintenance Unit Indexes field, and is specifically as follows:

TABLE 4

| Link Blockage Maintenance Unit Index | Link Blockage Maintenance Unit (μs) |
|---|---|
| 00 | TBD (To be determined) |
| 01 | TBD |
| 10 | TBD |
| 11 | TBD |

A value of the Link Blockage Maintenance Unit field in Table 4 may be determined based on a specific communication scenario. For example, with reference to the different communication scenarios in Table 1, for the value of the Link Blockage Maintenance Unit field, refer to Table 5 below. A unit of the Link Blockage Maintenance Unit field in Table 5 is μs.

TABLE 5

| | Beam width | | | |
|---|---|---|---|---|
| Scenario | Narrow beam 5° (STA-STA) | Wide beam 30° (STA-STA) | Narrow beam 5° (AP-STA) | Wide beam 30° (AP-STA) |
| Home living room | 3000~6000 | 18000~40000 | | |
| Dense wearables use in airplane | 800 | 5000 | | |
| Office conference room | 300~2000 | 2800~13500 | 6250 | 75000 |

With reference to Table 3 and Table 5, if a value of the Link Blockage Maintenance value field is greater than 0, the timing duration of the first timer is: LinkBlockageMaintenanceTime=LBMU*LBMV. LBMU is a value of the Link Blockage Maintenance Unit field (refer to Table 5), and LBMV is a value of the Link Blockage Maintenance Value field (refer to Table 3). If the value of the Link Blockage Maintenance Value field is 0, the first timer is in an undefined state, indicating that the STA does not participate in link blockage maintenance.

In addition, for the Link Blockage is Master field in Table 3, if the value of the Link Blockage is Master field is set to 1, it indicates that the STA or the AP is a leading party of transmission; or if the value of the Link Blockage is Master field is set to 0, it indicates that the STA or the AP is a subordinate party of transmission. In a transmission process between the first communications device and the second communications device at the two ends of the link, if lengths of remaining duration of first timers at the two ends are not equal, which duration of the first timer is used currently may be negotiated by the two ends of the link by using the Link Blockage is Master field. For example, for negotiation between the two ends, refer to Table 6 below:

TABLE 6

| Link is Master (DMG STA-A) | Link is Master (DMG STA-B) | Link Blockage Maintenance Time (DMG STA-A) vs Link Blockage Maintenance Time (DMG STA-B) | Result |
|---|---|---|---|
| 0 | 0 | >; = | Link Blockage Maintenance Time (DMG STA-A) |
| 1 | 0 | >; <; = | Link Blockage Maintenance Time (DMG STA-A) |
| 1 | 1 | = | Link Blockage Maintenance Time (DMG STA-A) |
| 1 | 1 | If either value equals 0 | Undefined |

In Table 6, DMG refers to Directional Multi Gigabyte, namely, billions of bits. In Table 6, that both the two ends of the link are STAs (namely, a STA-A and a STA-B) is used as an example. When lengths of remaining duration of first timers in a process of transmission between the STA-A and the STA-B are different, negotiation may be performed based on Link Blockage is Master field of the STA-A and the STA-B at the two ends. The following cases are included: 1. If Link Blockage is Master field of the STA-A and Link Blockage is Master field of the STA-B are both 0, and Link Blockage Maintenance Value field of the STA-A is greater than or equal to that of the STA-B, a value of the Link Blockage Maintenance Value field of the STA-B is replaced with a value of the Link Blockage Maintenance Value field of the STA-A; 2. If Link Blockage is Master field of the STA-A is 1, regardless of Link Blockage Maintenance Value field of the STA-A and Link Blockage Maintenance Value field of the STA-B, the Link Blockage Maintenance Value field of the STA-B is restored to that of the STA-A; 3. If Link Blockage is Master field of the STA-A and Link Blockage is Master field of the STA-B are both 1, and Link Blockage Maintenance Value field of the STA-A and Link Blockage Maintenance Value field of the STA-B are equal, values of the Link Blockage Maintenance Value field of the STA-A and the Link Blockage Maintenance Value field of the STA-B are set to the Link Blockage Maintenance Value field of the STA-A.

In conclusion, in the link restoration method provided in this embodiment of this application, before data is transmitted between two ends of the link, the first communications device determines the timing duration of the first timer based on the current communication scenario, and then sends the timing duration to the second communications device by using a corresponding communication frame. In this way, first timers at the two ends are simultaneously enabled when data transmission starts, and frame structure design of the communication frame in the transmission process ensures that the two ends of the link can negotiate current remaining duration of the first timers in the data transmission process. This can ensure accuracy of detecting, by the first communications device within the timing duration of the first timer, whether the link is restored, thereby greatly improving accuracy of maintaining the link by the first timer.

Optionally, all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 21:
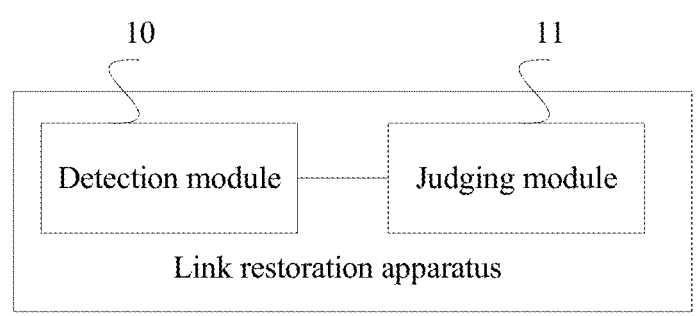
FIG. 21 is a schematic structural diagram of Embodiment 1 of a link restoration apparatus according to the embodiments of this application.

FIG. 21 is a schematic structural diagram of Embodiment 1 of the link restoration apparatus according to the embodiments of this application. The link restoration apparatus may be integrated into a first communications device, or may be integrated into a second communications device. Optionally, the link restoration apparatus may also be an independent first communications device or an independent second communications device. Optionally, the link restoration apparatus may be implemented by software, hardware, or a combination of software and hardware. As shown in FIG. 21, the link restoration apparatus includes a detection module 10 and a judging module 11.

Specifically, the detection module 10 is configured to: when quality of a link between a first communications device and a second communications device does not meet a preset condition, detect, within timing duration of a first timer, whether the link is restored, and obtain a detection result, where the timing duration of the first timer is blockage duration of a link blockage resulting from a user movement.

The judging module 11 is configured to determine, based on the detection result, whether to perform a link restoration operation, where the link restoration operation includes at least one of a beam tracking operation, a beam refinement operation, or a redo-beamforming operation.

The link restoration apparatus provided in this embodiment of this application may perform the foregoing method embodiment. An implementation principle and a technical effect of the link restoration apparatus are similar to those of the method embodiment. Details are not described herein.

Figure 22:
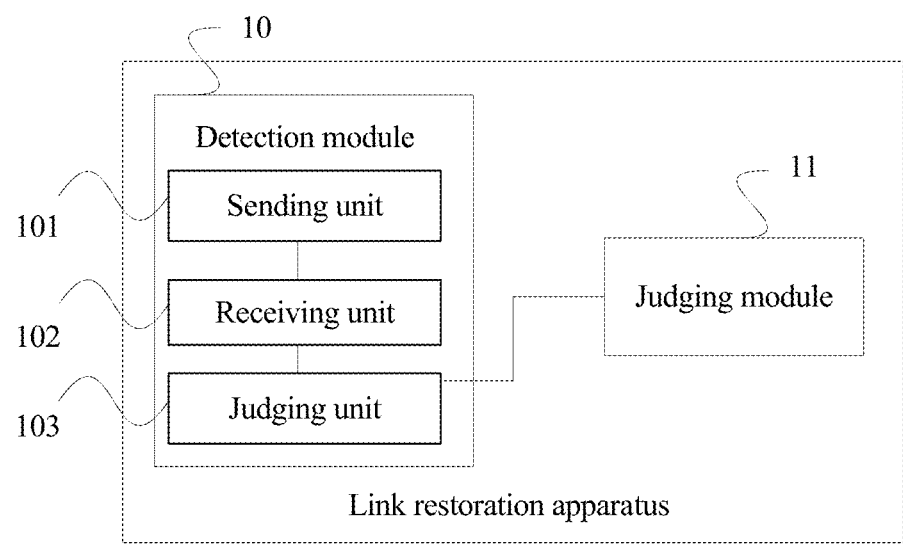
FIG. 22 is a schematic structural diagram of Embodiment 2 of the link restoration apparatus according to the embodiments of this application.

FIG. 22 is a schematic structural diagram of Embodiment 2 of the link restoration apparatus according to the embodiments of this application. On the basis of the foregoing embodiment, further, the foregoing detection module 10 specifically includes: a sending unit 101, a receiving unit 102, and a judging unit 103.

The sending unit 101 is configured to send a null data packet (NDP) to the second communications device.

The judging unit 103 is configured to: when the receiving unit 102 receives, before the first timer expires, response information sent by the second communications device, determine that the link is restored.

In FIG. 22, the sending unit 101 and the receiving unit 102 may be a transmit/receive chip or a transmit/receive circuit that has sending and receiving functions, or may be a transmit/receive chip or a transmit/receive circuit integrated with sending, receiving, and some processing functions. The some processing functions include functions such as modulation, demodulation, coding, decoding, scrambling, and descrambling. The detection module 10 and the judging module 11 may be processors or microprocessors on which a corresponding program that has a processing function is loaded.

In a possible implementation, the judging module 11 is specifically configured to: when the detection result is that restoration of the link is detected before the first timer expires, determine not to perform the beam tracking operation or the beam refinement operation, and reset the first timer to an initial value, where the timing duration of the first timer is less than timing duration of a beam link maintenance timer.

In another possible implementation, the judging module 11 is specifically configured to: when the detection result is that restoration of the link is detected after a beam link maintenance timer expires and before the first timer expires, determine, based on a detected link restoration moment, whether to perform the redo-beamforming operation.

Optionally, the judging module 11 is specifically configured to: when the detected link restoration moment is prior to an enabling moment of the redo-beamforming operation, determine not to perform the redo-beamforming operation.

Figure 23:
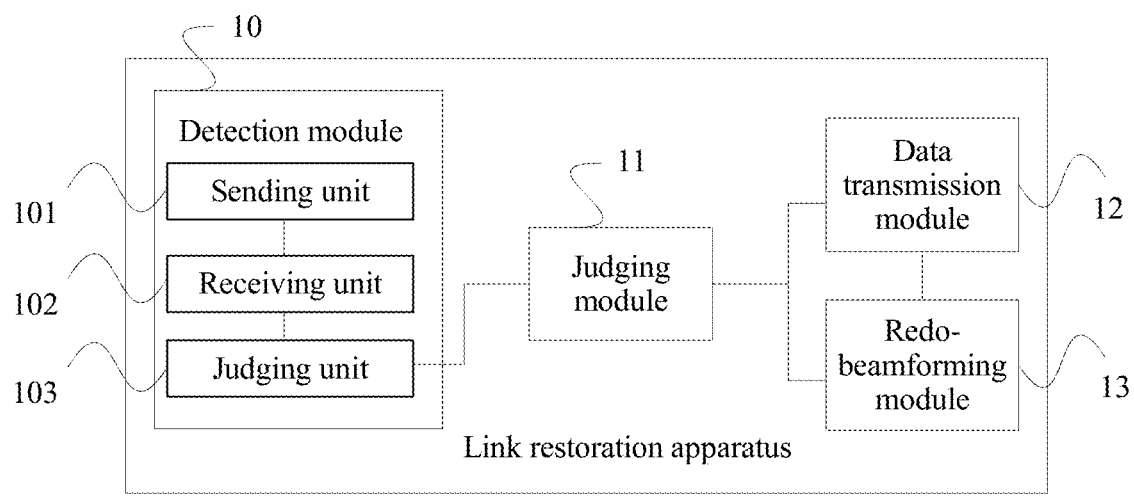
FIG. 23 is a schematic structural diagram of Embodiment 3 of the link restoration apparatus according to the embodiments of this application.

Optionally, referring to FIG. 23, FIG. 23 is a schematic structural diagram of Embodiment 3 of the link restoration apparatus. On the basis of the foregoing embodiment, the link restoration apparatus may further include a data transmission module 12. The judging module 11 is specifically configured to: if restoration of the link is not detected before the redo-beamforming operation is enabled, determine to perform the redo-beamforming operation, and when the detection module 10 detects restoration of the link, instruct the data transmission module 12 to transmit data by using an initial beam parameter used before the redo-beamforming.

Optionally, still referring to FIG. 23, the link restoration apparatus may further include a redo-beamforming module 13.

The judging module 11 is specifically configured to: if the detection result is that restoration of the link is not detected when the first timer expires, and if the redo-beamforming operation is not enabled, instruct the detection module 10 to stop link detection, and instruct the redo-beamforming module 13 to wait to perform the redo-beamforming operation, where the timing duration of the first timer is greater than timing duration of a beam link maintenance timer; or if the detection result is that restoration of the link is not detected when the first timer expires, and if the redo-beamforming operation is enabled after a beam link maintenance timer expires and before the first timer expires, instruct the data transmission module 12 to transmit data by using a beam parameter obtained after the redo-beamforming.

The link restoration apparatus provided in this embodiment of this application may perform the foregoing method embodiment. An implementation principle and a technical effect of the link restoration apparatus are similar to those of the method embodiment. Details are not described herein.

Figure 24:
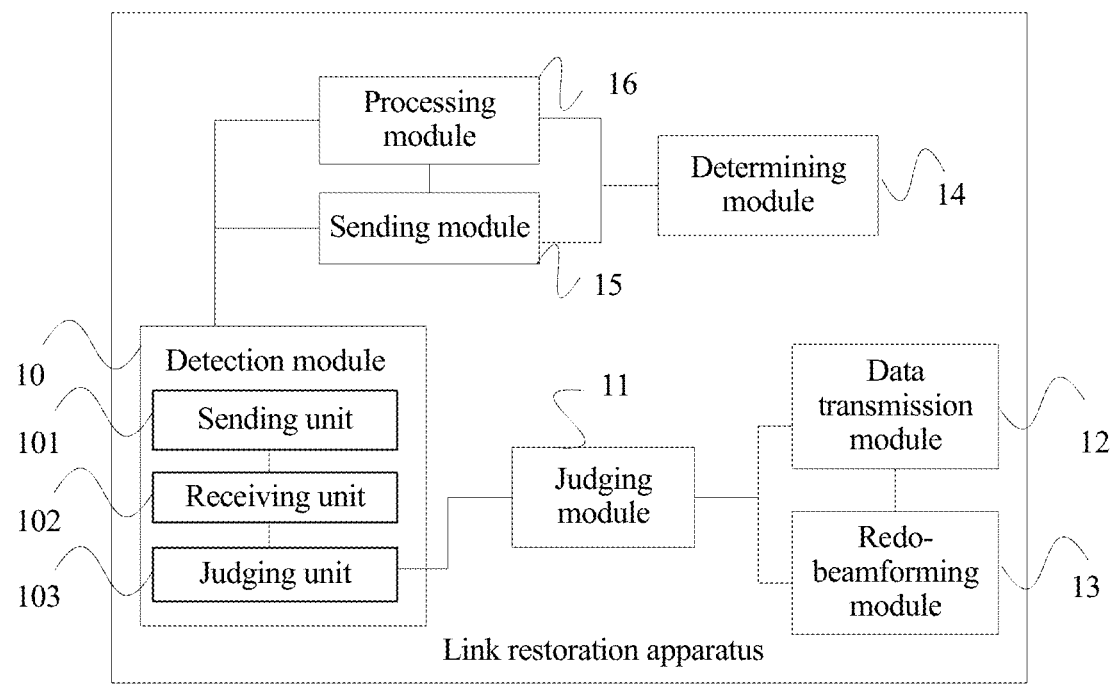
FIG. 24 is a schematic structural diagram of Embodiment 4 of the link restoration apparatus according to the embodiments of this application.

FIG. 24 is a schematic structural diagram of Embodiment 4 of the link restoration apparatus according to the embodiments of this application. On the basis of the foregoing embodiment, the foregoing link restoration apparatus may further include a determining module 14 and a sending module 15.

Specifically, the determining module 14 is configured to determine the timing duration of the first timer based on a current communication scenario, where the communication scenario includes any one of a blockage scenario of a home living room, a blockage scenario of dense wearables use in airplane, and a blockage scenario of an office conference room.

The sending module 15 is configured to send the timing duration of the first timer to the second communications device.

Further, the sending module 15 is specifically configured to add the timing duration of the first timer to a communication frame, and send the communication frame to the second communications device, where the communication frame includes any one of a probe Probe frame, an announce Announce frame, an information request frame, and a response frame. The communication frame includes: an Element ID field representing an identifier of an Element including the timing duration of the first timer, a link blockage maintenance field, and a Length field used to represent a length of the link blockage maintenance field; and the link blockage maintenance field is used to represent the timing duration of the first timer in the current communication scenario.

Still referring to FIG. 24, optionally, the link restoration apparatus may further include a processing module 16.

The processing module 16 is configured to enable the first timer when data is transmitted between the first communications device and the second communications device, and reset the first timer when the first communications device transmits first information.

The first information includes at least one of an immediate response, a service period request, a polling frame, an authorization frame, a request frame, an acknowledgement frame, a block acknowledgement frame, a directional multi-gigabit deny-to-send frame, and a directional multi-gigabit clear-to-send frame.

The link restoration apparatus provided in this embodiment of this application may perform the foregoing method embodiment. An implementation principle and a technical effect of the link restoration apparatus are similar to those of the method embodiment. Details are not described herein.

Figure 25:
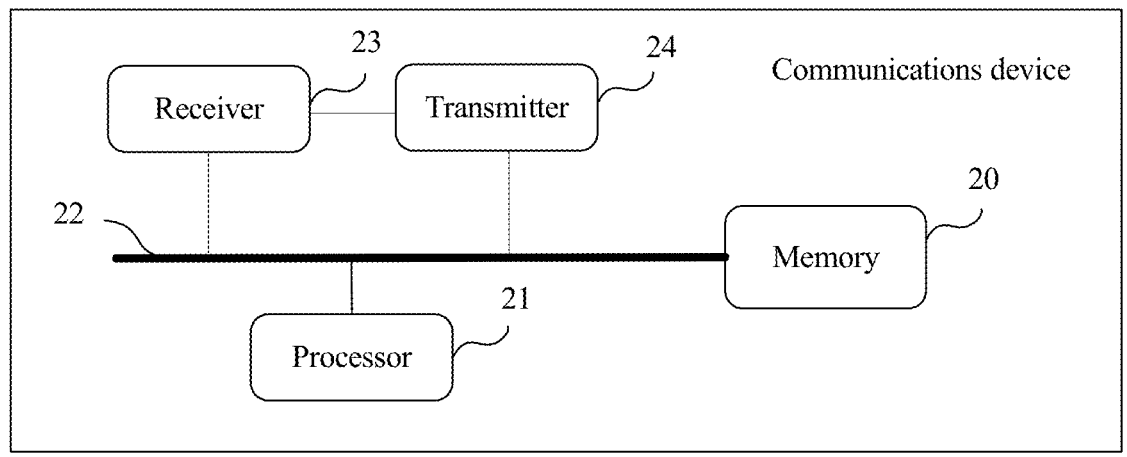
FIG. 25 is a schematic structural diagram of a communications device embodiment according to an embodiment of this application.

FIG. 25 is a schematic structural diagram of a communications device embodiment according to an embodiment of this application. As shown in FIG. 25, the communications device may include a memory 20, a processor 21, and at least one communications bus 22. The communications bus 22 is configured to implement a communication connection between components. The memory 20 may include a high-speed RAM memory, or may include a non-volatile memory NVM, for example, at least one disk memory. The memory 20 may store various programs, to complete various processing functions and implement method steps in this embodiment. Optionally, the communications device may further include a receiver 23 and a transmitter 24. The receiver 23 in this embodiment may be a corresponding input interface having a communication function and an information receiving function, or may be a radio frequency module or a baseband module on the communications device. The transmitter 24 in this embodiment may be a corresponding output interface having a communication function and an information sending function, or may be a radio frequency module or a baseband module on the communications device. Optionally, the transmitter 24 and the receiver 23 may be integrated into one communications interface, or may be two independent communications interfaces.

Specifically, in this embodiment, the processor 21 is configured to: if quality of a link between the communications device and a second communications device does not meet a preset condition, detect, within timing duration of a first timer, whether the link is restored, obtain a detection result, and determine, based on the detection result, whether to perform a link restoration operation, where the timing duration of the first timer is blockage duration of a link blockage resulting from a user movement, and the link restoration operation includes at least one of a beam tracking operation, a beam refinement operation, or a redo-beamforming operation.

Optionally, the transmitter 24 is configured to send a null data packet (NDP) to the second communications device; and the processor 21 is specifically configured to: when the receiver 23 receives, before the first timer expires, response information sent by the second communications device, determine that the link is restored.

Optionally, the processor 21 is specifically configured to: when the detection result is that restoration of the link is detected before the first timer expires, determine to skip performing the beam tracking operation or the beam refinement operation, and reset the first timer to an initial value, where the timing duration of the first timer is less than timing duration of a beam link maintenance timer.

Optionally, the processor 21 is specifically configured to: when the detection result is that restoration of the link is detected after a beam link maintenance timer expires and before the first timer expires, determine, based on a detected link restoration moment, whether to perform the redo-beamforming operation. To be specific, the processor 21 is specifically configured to: when the detected link restoration moment is prior to an enabling moment of the redo-beamforming operation, determine to skip performing the redo-beamforming operation; or the processor 21 is specifically configured to: if restoration of the link is not detected before the redo-beamforming operation is enabled, determine to perform the redo-beamforming operation, and when detecting restoration of the link, transmit data by using an initial beam parameter used before the redo-beamforming.

Optionally, the processor 21 is specifically configured to: if the detection result is that restoration of the link is not detected when the first timer expires, and if the redo-beamforming operation is not enabled, stop link detection, and wait to perform the redo-beamforming operation, where the timing duration of the first timer is greater than timing duration of a beam link maintenance timer; or the processor 21 is specifically configured to: if the detection result is that restoration of the link is not detected when the first timer expires, and if the redo-beamforming operation is enabled after a beam link maintenance timer expires and before the first timer expires, transmit data by using a beam parameter obtained after the redo-beamforming.

Optionally, the processor 21 is further configured to: before detecting by the first communications device within timing duration of a first timer, whether the link is restored, determine the timing duration of the first timer based on a current communication scenario, where the communication scenario includes any one of a blockage scenario of a home living room, a blockage scenario of dense wearables use in airplane, and a blockage scenario of an office conference room.

The transmitter 24 is configured to send the timing duration of the first timer to the second communications device.

Further, the transmitter 24 is specifically configured to add the timing duration of the first timer to a communication frame, and send the communication frame to the second communications device, where the communication frame includes any one of a probe Probe frame, an announce Announce frame, an information request frame, and a response frame. The communication frame includes: an Element ID field representing an identifier of the first timer, a link blockage maintenance field, and a Length field used to represent a length of the link blockage maintenance field; and the link blockage maintenance field is used to represent the timing duration of the first timer in the current communication scenario.

Optionally, the processor 21 is further configured to enable the first timer when data is transmitted between the communications device and the second communications device, and reset the first timer when the communications device transmits first information.

The first information includes at least one of an immediate response, a service period request, a polling frame, an authorization frame, a request frame, an acknowledgement frame, a block acknowledgement frame, a directional multi-gigabit deny-to-send frame, and a directional multi-gigabit clear-to-send frame.

The communications device provided in this embodiment of this application may perform the method embodiments. An implementation principle and a technical effect of the communications device are similar to those of the method embodiments, and details are not described herein again.

What is claimed is:

1. A link restoration method, comprising:
   when quality of a link between a first communications device and a second communications device does not meet a preset condition, detecting, by the first communications device within timing duration of a first timer, whether the link is restored, wherein detecting, by the first communications device within timing duration of the first timer, whether the link is restored comprises:
   sending, by the first communications device, a null data packet (NDP) to the second communications device; and
   when the first communications device receives, before the first timer expires, response information sent by the second communications device, determining that the link is restored; and
   obtaining a detection result, wherein the timing duration of the first timer is blockage duration of a link blockage resulting from a user movement; and
   determining, by the first communications device based on the detection result, whether to perform a link restoration operation, wherein determining, by the first communications device based on the detection result, whether to perform a link restoration operation comprises:
   when the detection result is that restoration of the link is detected before the first timer expires, determining, by the first communications device, not to perform a beam tracking operation or a beam refinement operation, and resetting the first timer to an initial value, wherein the timing duration of the first timer is less than timing duration of a beam link maintenance timer,
   wherein the link restoration operation comprises at least one of a beam tracking operation, a beam refinement operation, or a redo-beamforming operation.

2. The method according to claim 1, wherein determining, by the first communications device based on the detection result, whether to perform a link restoration operation comprises:
   when the detection result is that restoration of the link is detected after a beam link maintenance timer expires and before the first timer expires, determining, by the first communications device based on a detected link restoration moment, whether to perform the redo-beamforming operation.

3. The method according to claim 2, wherein determining, by the first communications device based on a detected link restoration moment, whether to perform the redo-beamforming operation comprises:
   when the detected link restoration moment is prior to an enabling moment of the redo-beamforming operation, determining, by the first communications device, not to perform the redo-beamforming operation.

4. The method according to claim 2, wherein:
   when restoration of the link is not detected before the redo-beamforming operation is enabled, determining, by the first communications device, to perform the redo-beamforming operation, and when detecting restoration of the link, transmitting data by using an initial beamforming pattern used before the redo-beamforming.

5. The method according to claim 1, wherein:
   when the detection result is that restoration of the link is not detected when the first timer expires, and when the redo-beamforming operation is not enabled, link detection is stopped, and the redo-beamforming operation waits to be performed, wherein the timing duration of the first timer is greater than timing duration of a beam link maintenance timer; or
   when the detection result is that restoration of the link is not detected when the first timer expires, and when the redo-beamforming operation is enabled after a beam link maintenance timer expires and before the first timer expires, data is transmitted by using a beam parameter obtained after the redo-beamforming.

6. The method according to claim 1, wherein before detecting, by the first communications device within timing duration of a first timer, whether the link is restored, the method further comprises:
   determining, by the first communications device, the timing duration of the first timer based on a current communication scenario, wherein the communication scenario comprises any one of a blockage scenario of a home living room, a blockage scenario of dense wearables use in airplane, and a blockage scenario of an office conference room; and
   sending, by the first communications device, the timing duration of the first timer to the second communications device.

7. The method according to claim 6, wherein sending, by the first communications device, the timing duration of the first timer to the second communications device comprises:
   adding, by the first communications device, the timing duration of the first timer to a communication frame, and sending the communication frame to the second communications device, wherein the communication frame comprises any one of a probe frame, an announce frame, an information request frame, and a response frame;
   wherein the communication frame comprises: an Element ID field representing an identifier of an Element including the timing duration of the first timer, a link blockage maintenance field, and a Length field used to represent a length of the link blockage maintenance field; and
   the link blockage maintenance field is used to represent the timing duration of the first timer in the current communication scenario.

8. The method according to claim 1, further comprising:
enabling the first timer when data is transmitted between the first communications device and the second communications device, and resetting the first timer when the first communications device transmits first information, wherein the first information comprises at least one of an immediate response, a request for service period, a polling frame, an authorization frame, a request frame, an acknowledgement frame, a block acknowledgement frame, a directional multi-gigabit deny-to-send frame, and a directional multi-gigabit clear-to-send frame.

9. A communications device, comprising:
a transmitter configured to send a null data packet (NDP) to a second communications device;
a receiver; and
a processor, configured to:
when quality of a link between the communications device and the second communications device does not meet a preset condition, detect, within timing duration of a first timer, whether the link is restored, obtain a detection result,
determine, based on the detection result, whether to perform a link restoration operation, wherein:
the timing duration of the first timer is blockage duration of a link blockage resulting from a user movement,
when the detection result is that restoration of the link is detected before the first timer expires, determine not to perform a beam tracking operation or a beam refinement operation, and reset the first timer to an initial value, wherein the timing duration of the first timer is less than timing duration of a beam link maintenance timer, and
the link restoration operation comprises at least one of a beam tracking operation, a beam refinement operation, or a redo-beamforming operation; and
when the receiver receives, before the first timer expires, response information sent by the second communications device, determine that the link is restored.

10. The communications device according to claim 9, wherein the processor is configured to:
when the detection result is that restoration of the link is detected after a beam link maintenance timer expires and before the first timer expires, determine, based on a detected link restoration moment, whether to perform the redo-beamforming operation.

11. The communications device according to claim 10, wherein the processor is configured to:
when the detected link restoration moment is prior to an enabling moment of the redo-beamforming operation, determine not to perform the redo-beamforming operation.

12. The communications device according to claim 10, wherein the processor is configured to:
when restoration of the link is not detected before the redo-beamforming operation is enabled, determine to perform the redo-beamforming operation, and when detecting restoration of the link, transmit data by using an initial beamforming pattern used before the redo-beamforming.

13. The communications device according to claim 9, wherein the processor is configured to:
when the detection result is that restoration of the link is not detected when the first timer expires, and if the redo-beamforming operation is not enabled, stop link detection, and wait to perform the redo-beamforming operation, wherein the timing duration of the first timer is greater than timing duration of a beam link maintenance timer; or
when the detection result is that restoration of the link is not detected when the first timer expires, and if the redo-beamforming operation is enabled after a beam link maintenance timer expires and before the first timer expires, transmit data by using a beam parameter obtained after the redo-beamforming.

14. The communications device according to claim 9, wherein:
the processor is further configured to:
determine the timing duration of the first timer based on a current communication scenario, wherein the communication scenario comprises any one of a blockage scenario of a home living room, a blockage scenario of dense wearables use in airplane, and a blockage scenario of an office conference room; and
the transmitter is configured to:
send the timing duration of the first timer to the second communications device.

15. The communications device according to claim 14, wherein:
the transmitter is configured to add the timing duration of the first timer to a communication frame, and send the communication frame to the second communications device, wherein the communication frame comprises any one of a probe frame, an announce frame, an information request frame, and a response frame;
the communication frame comprises: an Element ID field representing an identifier of an Element including the timing duration of the first timer, a link blockage maintenance field, and a Length field used to represent a length of the link blockage maintenance field; and
the link blockage maintenance field is used to represent the timing duration of the first timer in the current communication scenario.

16. The communications device according to claim 9, wherein the processor is further configured to:
enable the first timer when data is transmitted between the communications device and the second communications device, and reset the first timer when the communications device transmits first information, wherein the first information comprises at least one of an immediate response, a request for service period, a polling frame, an authorization frame, a request frame, an acknowledgement frame, a block acknowledgement frame, a directional multi-gigabit deny-to-send frame, and a directional multi-gigabit clear-to-send frame.

* * * * *